US011321885B1

(12) United States Patent
Du et al.

(10) Patent No.: US 11,321,885 B1
(45) Date of Patent: May 3, 2022

(54) GENERATING VISUALIZATIONS OF ANALYTICAL CAUSAL GRAPHS

(71) Applicant: Adobe Inc., San Jose, CA (US)

(72) Inventors: Fan Du, Milpitas, CA (US); Xiao Xie, Hangzhou (CN); Shiv Kumar Saini, Jhunjhunu (IN); Gaurav Sinha, Bangalore (IN); Ayush Chauhan, Bengaluru (IN)

(73) Assignee: Adobe Inc., San Jose, CA (US)

( * ) Notice: Subject to any disclaimer, the term of this patent is extended or adjusted under 35 U.S.C. 154(b) by 7 days.

(21) Appl. No.: 17/083,702

(22) Filed: Oct. 29, 2020

(51) Int. Cl.
*G06T 11/20* (2006.01)
*G06F 16/22* (2019.01)
*G06F 16/26* (2019.01)
*G06T 3/40* (2006.01)
*G06F 16/901* (2019.01)

(52) U.S. Cl.
CPC ........ *G06T 11/206* (2013.01); *G06F 16/2264* (2019.01); *G06F 16/26* (2019.01); *G06F 16/9024* (2019.01); *G06T 3/40* (2013.01); *G06T 2200/24* (2013.01)

(58) Field of Classification Search
CPC ..... G06T 11/206; G06T 3/40; G06T 2200/24; G06F 16/26; G06F 16/2264; G06F 16/9024
See application file for complete search history.

(56) References Cited

U.S. PATENT DOCUMENTS 9,542,662 B2 * 1/2017 Roesch ................ G06Q 10/063
10,768,421 B1 * 9/2020 Rosenberg .......... G06F 3/04815
(Continued)

FOREIGN PATENT DOCUMENTS

WO WO-2006060773 A2 * 6/2006 ........... G06F 16/248

OTHER PUBLICATIONS

N. Abe, N. K. Verma, C.Apteé, and R. Schroko.Cross channel optimized marketing by reinforcement learning. In Proceedings of the Tenth ACM SIGKDD International Conference on Knowledge Discovery and Data Mining, 2004, pp. 767-772, 2004.

(Continued)

*Primary Examiner* — Xin Sheng
(74) *Attorney, Agent, or Firm* — Keller Preece PLLC

(57) ABSTRACT

The present disclosure describes systems, methods, and non-transitory computer readable media for generating and providing a causal-graph interface that visually depicts causal relationships among dimensions and represents uncertainty metrics for such relationships as part of a streamlined visualization of a causal graph. The disclosed systems can determine causality among dimensions of multidimensional data and determine uncertainty metrics associated with individual causal relationships. Additionally, the disclosed system can generate a visual representation of a causal graph with nodes arranged in stratified layers and can connect the layered nodes with uncertainty-aware-causal edges to represent both the causality between the dimensions and the uncertainty metrics. Further, the disclosed systems can provide interactive tools for generating and visualizing predictions or causal relationships in intuitive user interfaces, such as visualizations for dimension-specific (or dimension-value-specific) interventions and/or attribution determinations.

20 Claims, 16 Drawing Sheets

(56) References Cited

U.S. PATENT DOCUMENTS

| | | | | |
|---|---|---|---|---|
| 2004/0072723 | A1* | 4/2004 | Palsson | G16B 40/30 514/1 |
| 2004/0243593 | A1* | 12/2004 | Stolte | G06F 16/212 |
| 2010/0317007 | A1* | 12/2010 | Palsson | G16B 5/00 435/6.1 |

OTHER PUBLICATIONS

S. Amershi, M. Chickering, S. M. Drucker, B. Lee, P. Y. Simard, and J. Suh. Modeltracker Redesigning performance analysis tools for machine learning. InProceedings of the 33rd Annual ACM Conference on Human Factors in Computing Systems, pp. 337-346, 2015.
J. Bae, T. Helldin, and M. Riveiro. Understanding indirect causal relationships in node-link graphs.Computer Graphics Forum, 36(3):411-421, 2017.
P. Boldi, F. Bonchi, A. Gionis, and T. Tassa. Injecting uncertainty in graphs for identity obfuscation.Proceedings of the VLDB Endowment., 5(11):1376-1387, 2012.
S. C. Brailsford, M. W. Carter, and S. H. Jacobson. Five decades of healthcare simulation. In2017 Winter Simulation Conference, WSC 2017, pp. 365-384, 2017.
K. P. Burnham and D. R. Anderson. Multimodel inference: understanding aic and bic in model selection.Sociological methods & research, 33(2):261-304, 2004.
R. Chen. Institutional characteristics and college student dropout risks: A multilevel event history analysis.Research in Higher education, 53(5):487-505, 2012.
S. Chen and T. Joachims. Predicting matchups and preferences in context. In Proceedings of the 22nd ACM SIGKDD International Conference on Knowledge Discovery and Data Mining, 2016, pp. 775-784, 2016.
D. M. Chickering. Optimal structure identification with greedy search. Journal of Machine Learning Research, 3:507-554, 2002.
D. Colombo and M. H. Maathuis. Order-independent constraint-based causal structure learning. Journal of Machine Learning Research, 15(1):3741-3782, 2014.
G. F. Cooper and E. Herskovits. A bayesian method for the induction of probabilistic networks from data.Machine learning, 9(4):309-347, 1992.
T. H. Cormen, C. E. Leiserson, R. L. Rivest, and C. Stein. Introduction to algorithms. 2009. Part 1.
T. H. Cormen, C. E. Leiserson, R. L. Rivest, and C. Stein. Introduction to algorithms. 2009. Part 2.
A. P. Dawid. Conditional independence in statistical theory. Journal of the Royal Statistical Society: Series B (Methodological), 41(1):1-15, 1979.
P. O. S. V. de Melo, V. A. F. Almeida, A. A. F. Loureiro, and C. Faloutsos. Forecasting in the NBA and other team sports: Network effects in action. TKDD, 6(3):13:1-13:27, 2012.
D. Dua and C. Graff. UCI machine learning repository, 2017.
P. Eades and N. C. Wormaid. Edge crossings in drawings of bipartite graphs.Algorithmica, 11(4):379-403, 1994.
N. Elmqvist and P. Tsigas. Causality visualization using animated growing polygons. In9th IEEE Symposium on Information Visualization, 2003, pp. 189-196, 2003.
A. Gabel and S. Redner. Random walk picture of basketball scoring.Journal of Quantitative Analysis in Sports, 8(1).
Z. Ghahramani. Learning dynamic bayesian networks. InInternational School on Neural Networks, Initiated by HASS and EMFCSC, pp. 168-197. Springer, 1997.
M. Gleicher, D. Albers, R. Walker, I. Jusufi, C. D. Hansen, and J. C. Roberts. Visual comparison for information visualization. Information Visualization, 10(4):289-309, 2011.
H. Guo, J. Huang, and D. H. Laidlaw. Representing uncertainty in graph edges: An evaluation of paired visual variables.IEEE Transactions on Visualization and Computer Graphics, 21(10):1173-1186, 2015.
S. Hochreiter and J. Schmidhuber. Long short-term memory. Neural computation, 9(8):1735-1780, 1997.
F. Hohman, A. Head, R. Caruana, R. DeLine, and S. M. Drucker. Gamut: A design probe to understand how data scientists understand machine learning models. In Proceedings of the 2019 CHI Conference on Human Factors in Computing Systems, p. 579, 2019.
J. Hullman, X. Qiao, M. Correll, A. Kale, and M. Kay. In pursuit of error: A survey of uncertainty visualization evaluation.IEEE Transactions on Visualization and Computer Graphics, 25(1):903-913, 2019.
N. R. Kadaba, P. Irani, and J. Leboe. Visualizing causal semantics using animations.IEEE Transactions on Visualization and Computer Graphics, 13(6):1254-1261, 2007.
P. Kaufman, M. N. Alt, and C. D. Chapman. Dropout rates in the United States: 2001. statistical analysis report nces 2005-046.US Department of Education, 2004.
J. Krause, A. Perer, and K. Ng. Interacting with predictions: Visual inspection of black-box machine learning models. In Proceedings of the 2016 CHI Conference on Human Factors in Computing Systems, pp. 5686-5697, 2016.
A. Krizhevsky, I. Sutskever, and G. E. Hinton. Imagenet classification with deep convolutional neural networks. InAdvances in neural information processing systems, pp. 1097-1105, 2012.
Y. Lu, R. Garcia, B. Hansen, M. Gleicher, and R. Maciejewski. The state-of-the-art in predictive visual analytics.Computer Graphics Forum, 36(3):539-562, 2017.
S. Merritt and A. Clauset. Scoring dynamics across professional team sports: tempo, balance and predictability.EPJ Data Sci., 3(1):4, 2014.
L. Peel and A. Clauset. Predicting sports scoring dynamics with restoration and anti-persistence. In2015 IEEE International Conference on Data Mining, pp. 339-348, 2015.
J.-P. Pellet and A. Elisseeff. Using markov blankets for causal structure learning.Journal of Machine Learning Research, 9(Jul):1295-1342, 2008.
S. B. Plank, S. DeLuca, and A. Estacion. High school dropout and the role of career and technical education: A survival analysis of surviving high school.Sociology of Education, 81(4):345-370, 2008.
J. Ramsey, M. Glymour, R. Sanchez-Romero, and C. Glymour. A million variables and more: the fast greedy equivalence search algorithm for learning high-dimensional graphical causal models, with an application to functional magnetic resonance images. International Journal of Data Science and Analytics, 3(2):121-129, 2017.
P. Rzepakowski and S. Jaroszewicz. Decision trees for uplift modeling. In 2010 IEEE International Conference on Data Mining, pp. 441-450. IEEE, 2010.
C. Schulz, A. Nocaj, J. Gortler, O. Deussen, U. Brandes, and D. Weiskopf. Probabilistic graph layout for uncertain network visualization. IEEE Transactions on Visualization and Computer Graphics, 23(1):531-540, 2017.
G. Schwarz et al. Estimating the dimension of a model.The annals of statistics, 6(2):461-464, 1978.
R. Shanmugam. Causality: Models, reasoning, and inference : Judea pearl; Cambridge university press, cambridge, uk, 2000, pp. 384, ISBN 0-521-77362-8.Neurocomputing, 41(1-4):189-190, 2001.
D. Silver, L. Newnham, D. Barker, S. Weller, and J. McFall. Concurrent reinforcement learning from customer interactions. InInternational Conference on Machine Learning, pp. 924-932, 2013.
P. Spirtes and C. Glymour. An algorithm for fast recovery of sparse causal graphs.Social science computer review, 9(1):62-72, 1991.
P. Spirtes, C. Glymour, and R. Scheines. From probability to causality. Philosophical Studies: An International Journal for Philosophy in the Analytic Tradition, 64(1):1-36, 1991.
P. Vracar, E. Strumbelj, and I. Kononenko. Modeling basketball play-by-play data.Expert Syst. Appl., 44:58-66, 2016.
J. Wang and K. Mueller. The visual causality analyst: An interactive interface for causal reasoning.IEEE Transactions on Visualization and Computer Graphics, 22(1):230-239, 2016.
J. Wang and K. Mueller. Visual causality analysis made practical. In 2017 IEEE Conference on Visual Analytics Science and Technology, pp. 151-161, 2017.

(56) References Cited

OTHER PUBLICATIONS

J. Wang, K. Zhao, D. Deng, A. Cao, X. Xie, Z. Zhou, H. Zhang, and Y. Wu. Tac-simur: Tactic-based simulative visual analytics of table tennis. IEEE Transactions on Visualization and Computer Graphics, 26(1):407-417, 2020.
Y. Wang, Q. Shen, D. W. Archambault, Z. Zhou, M. Zhu, S. Yang, and H. Qu. Ambiguityvis: Visualization of ambiguity in graph layouts.IEEE Transactions on Visualization and Computer Graphics, 22(1):359-368, 2016.
J. Wexler, M. Pushkarna, T. Bolukbasi, M. Wattenberg, F. B. Viegas, and J. Wilson. The what-if tool: Interactive probing of machine learning models. IEEE Transactions on Visualization and Computer Graphics, 26(1):56-65, 2020.
C. Xiong, J. Shapiro, J. Hullman, and S. Franconeri. Illusion of causality in visualized data.IEEE Transactions on Visualization and Computer Graphics, 26(1):853-862, 2020.
C. Yen, A. Parameswaran, and W. Fu. An exploratory user study of visual causality analysis.Computer Graphics Forum, 38(3):173-184, 2019.
X. Zhao, Y. Wu, D. L. Lee, and W. Cui. iforest: Interpreting random forests via visual analytics. IEEE Transactions on Visualization and Computer Graphics, 25(1):407-416, 2019.

\* cited by examiner

GENERATING VISUALIZATIONS OF ANALYTICAL CAUSAL GRAPHS

BACKGROUND

Computer engineers have designed causal analysis system that increasingly use causal relationships to guide decision making and analytical tasks across various domains, from digital content campaigns to education and social science. To this end, two main categories of causal analysis systems have developed that implement constraint-based models and score-based models. These conventional causal analysis systems apply different detection approaches but share similar output, i.e., a causal graph where nodes encode data dimensions and edges encode causal directions. From these causal graphs, in recent years, researchers have designed interactive systems for exploratory causal analysis. Despite facilitating such analysis, conventional causal analysis systems have used computing models that struggle with (i) accurately estimating uncertainty of causal relationships or representing such uncertainty in a causal graphs, (ii) providing interactive tools for utilizing or exploring a causal graph in a visualization, or (iii) efficiently presenting causal relationships and changes to a causal graph in simple, user-friendly graphical user interfaces.

When detecting causal relationships in a high-dimensional dataset, for instance, some conventional causal analysis systems inaccurately represent causality between dimensions by, for example, generating false causal relationships or an inaccurate representation of certainty for causal relationships. In particular, many conventional systems apply a greedy search algorithm to determine causal relationships between data dimensions, but greedy search algorithms can introduce false positives in some cases by indicating causal relationships where no such relationships actually exists. Specifically, conventional causal analysis systems that utilize greedy search algorithms rely on causal determinations that are sometimes too determinative and cannot account for the uncertainty of such causal determinations between dimensions. As a result of introducing false positives or inaccurate certainty in the determination of causal relationships, conventional systems that utilize these algorithms generate and provide misleading representations of causality that reflect incomplete or inaccurate causal relationships from dimension to dimension.

In addition to inaccurately determining or representing uncertainty of causal relations, many conventional causal analysis systems lack interactive visualization tools to utilize a causal graph. Some conventional systems, for example, generate causal graphs that are confusing and difficult to interpret due to, for example, large numbers of cross-layer causal relationships that overlap each other and create a webbed and disorganized visualization of nodes and edges that is hard to understand. Additionally, conventional systems generally often provide few or no interactive tools for breaking down and visually interpreting data presented within a causal graph or for extrapolating from determined causal relationships to visualize predictions from a causal graph.

Due at least in part to their lack of interactive visualization tools and overly complex visualizations, many conventional causal analysis systems also inefficiently present causal relationships or reflect attributions or interventions in overly complicated visualizations. More precisely, many conventional systems provide inefficient user interfaces that require excessive numbers of user interactions to access desired data and/or functionality. To elaborate, some conventional systems represent causal relationships with visualizations of relationships that look like tangled webs among dimensions arranged in seemingly random orders, where it becomes more difficult to trace links between dimensions as the number of dimensions grows larger. In addition, many conventional require navigating to (and through) multiple separate interfaces—beyond or in addition to an interface illustrating causal relationships among dimensions—to perform an intervention or determine an attribution for a dataset. As a result of their convoluted nature, these conventional systems inefficiently consume computing resources, such as processing time, processing power, and memory in processing excessive user inputs to navigate through many layers and/or interfaces to view causal relationships between dimensions of a causal graph. By requiring such inefficient, onerous user interaction, these conventional systems utilize computing resources that could otherwise be preserved.

Thus, there are several disadvantages with regard to conventional causal analysis systems.

SUMMARY

This disclosure describes one or more embodiments of methods, non-transitory computer-readable media, and systems that solve one or more of the foregoing problems and provide other benefits. For example, the disclosed systems can generate and provide a causal-graph interface that visually depicts causal relationships among dimensions and represents uncertainty metrics for such relationships as part of a streamlined visualization of a causal graph—alongside interactive tools for exploration of causal information. In particular, the disclosed systems can determine causality between dimensions of multidimensional data and determine uncertainty metrics associated with individual causal relationships between dimensions. Upon identifying such relationships and uncertainty metrics, the disclosed system can generate a visual representation of a causal graph with nodes arranged in stratified layers—where parent nodes are arranged in layers above respective child nodes—and connect the layered nodes with uncertainty-aware-causal edges to represent both the causality between the dimensions and the uncertainty metrics. In addition to intuitive visualizations of a causal graph, in some cases, the disclosed systems provide interactive tools for generating and visualizing predictions or causal relationships in intuitive user interfaces, such as visualizations for dimension-specific (or dimension-value-specific) intervention and/or attribution determinations.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
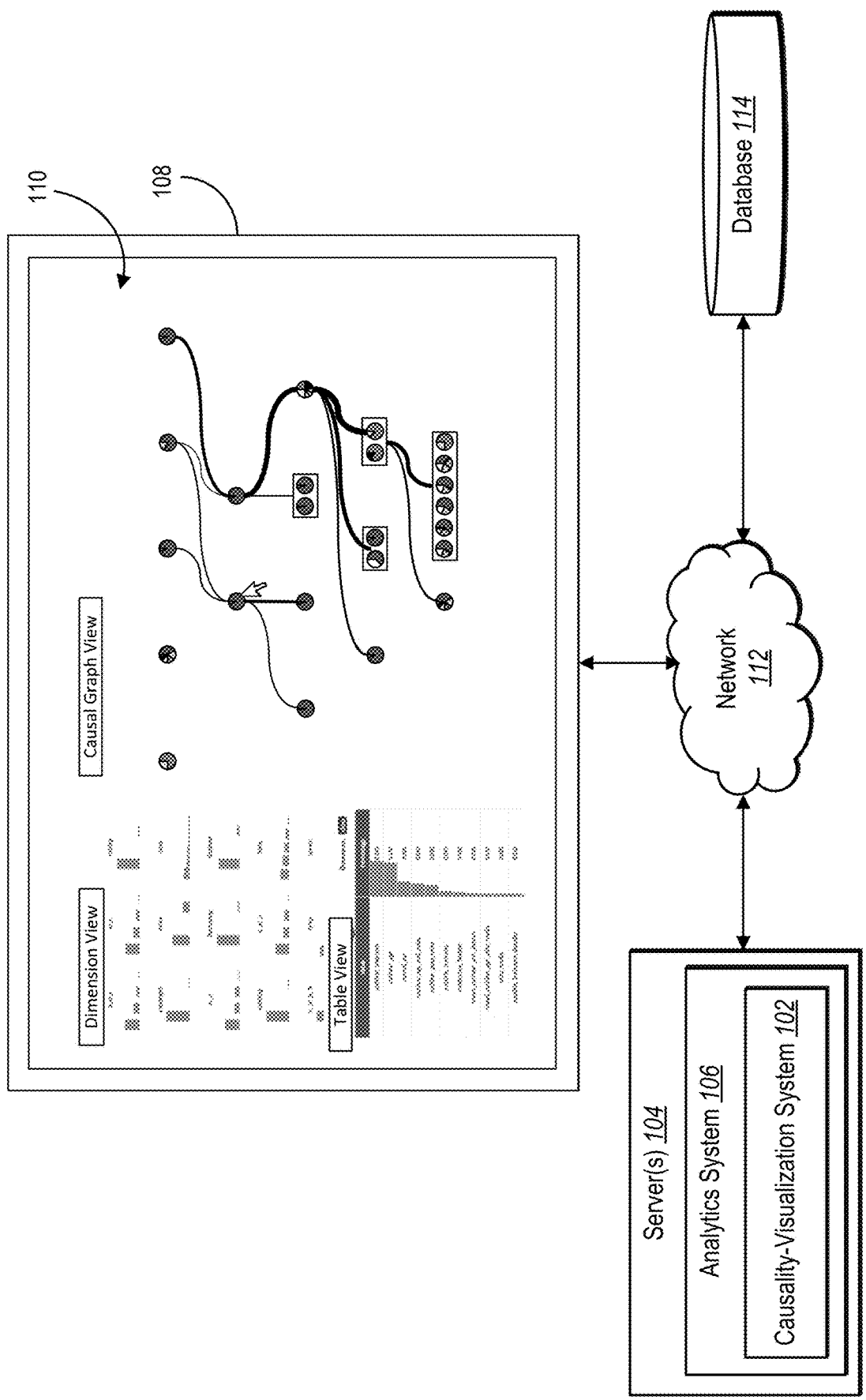
FIG. 1 illustrates an example system environment in which a causality-visualization system operates in accordance with one or more embodiments.

This disclosure describes one or more embodiments of a causality-visualization system that determines and presents causal relationships among dimensions of multidimensional data and uncertainty for such relationships in a causal-graph interface. In particular, in embodiments described herein, the causality-visualization system generates and provides a causal-graph interface that includes layered nodes representing dimensions of multidimensional data in a stratified fashion such that causality flows from one direction to the other (e.g., from top to bottom). To generate the causal-graph interface, the causality-visualization system determines causal relationships between dimensions and further determines uncertainty metrics associated with the causal relationships. In some embodiments, the causality-visualization system further determines attribution and/or intervention for particular dimensions based on user interaction requesting an attribution or an intervention. In addition, in certain embodiments, the causality-visualization system provides interactive tools to determine and visually present depictions of causal relationships, uncertainty, attribution, and intervention for dimensions of multidimensional data.

As mentioned, in embodiments described herein, the causality-visualization system determines causal relationships between dimensions of a multidimensional dataset. In some embodiments, the causality-visualization system generates a causal graph that represents such causal relationships among various dimensions. For example, in the field of medicine, the causality-visualization system determines or detects how one dimension (e.g., roaring) causes or leads to another dimension (e.g., nausea). In some embodiments, the causality-visualization system utilizes a particular causality discovery algorithm to generate a causal graph of, or to determine causal relationships between, dimensions, such as a greedy equivalent search ("GES") algorithm or a fast greedy equivalent search ("F-GES") algorithm.

As also mentioned, in certain embodiments, the causality-visualization system further determines uncertainty metrics associated with causal relationships. For instance, the causality-visualization system determines, for a given causal relationship indicating causality from one dimension to another, an uncertainty metric that indicates a measure of error associated with, or a likelihood of incorrectly (or correctly) identifying, a causal relationship. Indeed, causal relationships are not always assured, and the causality-visualization system accounts for the possibility of error in a causal-relationship determination by generating uncertainty metrics. In one or more embodiments, the causality-visualization system implements a particular uncertainty-determination algorithm to determine uncertainty metrics associated with individual causal relationships, such as by determining and comparing a Bayesian information criterion ("BIC") for a causal graph with or without a particular causal relationship.

Based on determining causal relationships and corresponding uncertainty metrics, in some embodiments, the causality-visualization system generates and provides a causal-graph interface for display on a client device. For example, the causality-visualization system generates a causal-graph interface that includes a visual representation of a causal graph reflecting causal relationships and uncertainty metrics together. In some cases, the causality-visualization system generates a causal-graph interface that includes layered nodes representing individual dimensions of multidimensional data. For instance, the causal-graph interface can include a stratified or hierarchical arrangement of layered nodes where nodes positioned above (e.g., in higher layers) other nodes have causal effects on nodes positioned below (e.g., in lower layers) them.

Indeed, in certain cases, the causality-visualization system determines layers for placing the layered nodes within a causal-graph interface. For example, the causality-visualization system groups a first set of nodes that do not have parent nodes (e.g., nodes that correspond to no other dimensions contributing to their cause) into a first layer. In addition, the causality-visualization system groups a second set of nodes into a second layer (below the first layer) and connects certain nodes of the second set to certain nodes of the first set based on identifying those nodes in the first set that contribute to nodes in the second set.

In one or more embodiments, the causality-visualization system generates uncertainty-aware-causal edges between nodes to represent causal relationships between dimensions and also to represent uncertainty metrics associated with the causal relationships. In some cases, an uncertainty-aware-causal edge connecting two nodes indicates a causal relationship between the two corresponding dimensions (e.g., where the parent node represents a dimension that causally contributes to a dimension represented by the child node). In these or other cases, an uncertainty-aware-causal edge further indicates an uncertainty metric by having a certain thickness where, for example, a thicker or heavier uncertainty-aware-causal edge represents a more certain causal relationship (e.g., a causal relationship with a smaller uncertainty metric) and a thinner or lighter uncertainty-aware-causal edge represents a less certain causal relationship (e.g., a causal relationship with a larger uncertainty metric). Additionally or alternatively, the causality-visualization system utilizes different colors, color shading, patterns, different measures of transparency, or different measures of lightness to indicate variations among uncertainty metrics.

In one or more embodiments, the causality-visualization system animates portions of the causal-graph interface. For example, the causality-visualization system animates uncertainty-aware-causal edges that connect nodes to illustrate an in-motion representation of the causal directionality of causal relationships associated with a particular node. In some cases, the causality-visualization system receives a user interaction selecting or hovering over a particular layered node within the causal graph, and in response, the causality-visualization system animates the uncertainty-aware-causal edges connected to the node. For instance, the causality-visualization system animates the uncertainty-aware-causal edges to show a movement, or a flow, of causality coming into the node from any uncertainty-aware-causal edges above the node and the causal directionality coming out of the node from any uncertainty-aware-causal edges below the node.

In the same or other embodiments, the causality-visualization system generates and provides a causal sub-graph for display based on user input. For instance, the causality-visualization system receives an indication of a user interaction to select a particular node within a causal graph, and the causality-visualization system provides a breakdown of the selected node isolated from other nodes of the graph. In some cases, the causality-visualization system isolates the selected node by generating a causal sub-graph for the node that includes a visualization of the selected node along with those nodes (e.g., parent nodes and/or grandparent nodes) whose dimensions have causal contributions to the dimension of the selected node. In certain embodiments, the causality-visualization system generates a causal sub-graph that removes, or hides from display within a user interface, layered nodes other than the selected node and a set of higher-layer nodes whose dimensions have causal contributions to the dimension of the selected node.

In addition to representing causality and uncertainty, in certain described embodiments, the causality-visualization system further generates or provides the causal-graph interface to hide, or reduce the appearance of, cross-layer edges. For instance, the causality-visualization system hides cross-layer edges that represent causal relationships between dimensions more than one layer apart and that thus cross over intermediate layers to connect nodes. In some implementations, the causality-visualization system provides data to a client device to hide cross-layer edges while displaying neighboring-layer edges within the causal-graph interface. Indeed, the causality-visualization system displays neighboring-layer edges that connect nodes in neighboring or adjacent layers (e.g., with no layers in between them).

In certain cases, the causality-visualization system visually identifies hidden cross-layer edges representing causal relationships that span across layers of the causal graph by indicating (or providing data to a client device to indicate) the cross-layer edges with a specialized hidden-edge indicator (e.g., a graphical element placed adjacent to a node that would otherwise show a cross-layer edge). For instance, in some cases, the causality-visualization system replaces a cross-layer edge with a hidden-edge indicator to signal that the cross-layer edge has been hidden from view.

In the same or other embodiments, the causality-visualization system aggregates (or provides data to cause a client device to aggregate) certain nodes within the causal-graph interface. For example, the causality-visualization system aggregates nodes by identifying nodes that are related in direct causal chains (e.g., nodes whose dimensions have one-to-one chains of causality without further branches) and consolidating or collapsing those nodes into a single-layer node group. To elaborate, in some cases, the causality-visualization system identifies a first node connected as a parent node to a second node which is then connected as a subsequent parent node to third node. In addition, the causality-visualization system determines that the first, second, and third nodes form a chain of one-to-one causal edges based on each of the first, second, and third nodes not connecting as a parent node to any additional nodes. The causality-visualization system thus aggregates the first, second, and third nodes into a node group in a single layer. Additional detail regarding the causal-graph interface and the appearance of layered nodes, uncertainty-aware-causal edges, hidden-edge indicators, and single-layer node groups is provided below with reference to the figures.

As mentioned above, in certain embodiments, the causality-visualization system determines and visualizes attribution for a particular dimension. For instance, the causality-visualization system receives an indication of a user interaction selecting a particular node (e.g., from a causal graph or a corresponding histogram view of dimensions) and provides selectable options for performing attribution for the dimension corresponding to the selected node. For example, the causality-visualization system determines degrees or measures of causality that other dimensions have on a particular dimension (e.g., a dimension corresponding to a selected node). For instance, the causality-visualization system determines an apportionment, a proportion, or a percentage, of contribution associated another dimension that indicates a degree to which the other dimension contributes to the cause of a given dimension. In some cases, the causality-visualization system provides a visual representation of attribution within a causal-graph interface. For instance, the causality-visualization system modifies (or provides data for a client device to modify) sizes of nodes to represent respective measures or causal contributions for the dimensions corresponding to the nodes (e.g., where larger nodes contribute more heavily than smaller nodes).

In addition to attribution, in some embodiments, the causality-visualization system determines and visualizes an intervention for a particular dimension. For example, the causality-visualization system receives an indication of a user interaction selecting an intervention option in relation to a particular dimension. Based on the user interaction, in some cases, the causality-visualization system provides a breakdown of individual constituent dimension values associated with the selected dimension and further provides an option to edit or modify one or more of the dimension values. In some embodiments, in response to modifying one or more of the dimension values, the causality-visualization system projects or predicts an effect on dimension values that would result from such modification, such as an increase or a decrease in specific dimension values within various other dimensions. In some cases, the causality-visualization system further provides a visual representation of the intervention by depicting (or providing data for a client device to depict) the predicted changes to the dimensions and/or the dimension values that would result from the dimension-value modification.

As suggested above, the causality-visualization system provide several advantages over conventional causal analysis systems. For example, in certain embodiments, the causality-visualization system more accurately represents causal relationships and a degree of certainty for such relationships than conventional systems. In particular, while some conventional systems visually represent false causal relationships or fail to visually indicate certainty for identified causal relationships, in one or more embodiments, the causality-visualization system corrects for such false indications. To correct for such inaccurate visualization of certainty or depiction of false determinations of causal relationships, the causality-visualization system determines and visually represents uncertainty metrics associated with causal relationships to reflect a confidence or a surety that such causal relationships are correct. For example, in some embodiments, the causality-visualization system generates and presents uncertainty-aware-causal edges that reflect both causal relationships and uncertainty metrics together. Thus, unlike conventional systems that do not account for uncertainty, the causality-visualization system can not only determine causal relationships among dimensions but further determine and visualize uncertainty metrics for such relationships, resulting in a more accurate representation of causality among dimensions. For instance, the causality-visualization system generate an uncertainty-aware-causal edge that represents an uncertainty of a causal relationship by thickness, color, color shading, pattern, or differing transparency.

In addition to improving accuracy in representing uncertain causality, certain embodiments of the causality-visualization system provide new functionality relating to causal graphs. For instance, unlike conventional systems that provide little or no interactivity with a causal graph, the causality-visualization system provides robust interactive tools for breaking down and visually interpreting causal-graph information, such as causal directionality, attribution, and intervention. In some embodiments, the causality-visualization system represents causal relationships by placing nodes into layers and hiding cross-layer edges. In these or other embodiments, the causality-visualization system further provides intuitive visualizations for attribution by resizing nodes to reflect their measures of causal contribution with respect to a selected node. Further, the causality-visualization system provides intuitive visualizations for intervention by generating and providing hybrid graphical bars that represent the predicted results of hypothetical changes to particular dimension values.

Resulting from their lack of visualization tools to accommodate variations in data, many conventional systems generate causal graphs that sometimes include large numbers of cross-layer causal relationships, which makes for a convoluted and confusing causal graph. The causality-visualization system, on the other hand, generates a causal-graph interface that reduces or hides cross-layer edges. Additionally, the causality-visualization system provides other visualization improvements such as stratified layered nodes arranged such that causal nodes are depicted above descendant nodes and where nodes without descendants are arranged to the left. Compared to conventional systems, the causality-visualization system therefore generates a cleaner, easier-to-interpret visualization of causality among dimensions. To this end, in some embodiments, the causality-visualization system utilizes a novel topological layout algorithm to generate the causal-graph interface by (i) arranging nodes in layers according to causality, (ii) aggregating nodes linked by one-to-one edges in a causal chain, and (iii) hiding cross-layer edges.

Due at least in part to the improved technology and new functionality in providing improved visualizations, in some cases, the causality-visualization system further improves efficiency over conventional causal analysis systems by generating intuitive and easy-to-use graphical user interfaces for a causal graph. In particular, some embodiments of the causality-visualization system provide more efficient user interfaces that require fewer user interactions to access desired data and/or functionality. To elaborate, compared to conventional systems that require numerous user interactions and/or multiple separate applications to visualize causal directionality between dimensions of a causal graph as well as attribution and intervention results, the causality-visualization system consolidates, and provides improved visualizations of, causal information and causal-exploration functionality in a single user interface. For example, the causality-visualization system generates and provides a causal-graph interface that graphically illustrates causal directionality and uncertainty metrics using uncertainty-aware-causal edges. In addition (e.g., within the same user interface), the causality-visualization system provides instructions to cause a client device to visually identify nodes representing contributing dimensions for an attribution (e.g., by resizing the nodes). Further (e.g., within the same user interface), the causality-visualization system provides instructions to cause the client device to modify graphical representations of dimension values based on predicted changes for an intervention.

Relatedly, while some conventional causal analysis systems generate causal graphs over small datasets, these conventional systems utilize algorithms that are computationally prohibitive for use on large datasets. As a result, the causal graphs generated by many conventional systems are impractical or uninterpretable when applied to large datasets. By utilizing more efficient algorithms and by generating a more intelligent causal-graph interface, the causality-visualization system provides marked improvement in visually representing causal relationships among dimensions. These visualization improvements become more salient as datasets grow larger and as the visual representations of dimensions, causal relationships, and uncertainty grow in scale.

As suggested by the foregoing discussion, this disclosure utilizes a variety of terms to describe features and benefits of the causality-visualization system. Additional detail is hereafter provided regarding the meaning of these terms as used in this disclosure. In particular, the term "dimension" refers to a set, a category, or a classification of values for organizing or attributing underlying data (e.g., dimension values). In some cases, a dimension includes a set of values for analyzing, grouping, or comparing multidimensional data for digital-content campaigns, education, medicine, other any other category of data. In some embodiments, a dimension refers to non-numeric characteristics that correlate, relate, or classify multidimensional data (e.g., characteristics of a digital device or interactions or other actions of that digital device). Dimensions include, but are not limited to, software application, country, city, or zip code, browser type, distribution channels, language, products, product names, webpages, campaigns, ages, dates, monitor resolutions, genders, geographic locations, pages, or page names.

Relatedly, a "dimension value" refers to an element or particular data for a particular dimension. In particular, a dimension value can refer to a particular item, value, or component in a particular dimension. A dimension often includes a plurality of dimension values, each making up an allotment or a percentage of the overall dimension. Example dimension values include a particular software application, a particular language, a particular device identifier, a particular operating system, a particular browser, a particular javascript used, a particular treatment type (e.g., a type of medicine), a particular symptom (e.g., nausea), a particular distribution channel, a particular product, a particular product name, a particular webpage, a particular webpage name, a particular campaign, a particular age, a particular date, a particular monitor resolution, a particular gender, a particular geographic location, or some other constituent value of a dimension.

Indeed, the causality-visualization system generates and provides a causal graph made up of layered nodes and uncertainty-aware-causal edges. As used herein, a "causal graph" refers to a graphical model representing dependencies among digital data. In particular a causal graph can refer to a graphical model that represents set of dimensions and causal relationships among the set of dimensions. In some cases, a causal graph includes a visual representation of dimensions and causal relationships, while in other cases, a causal graph includes dimensions and causal relationships between the dimensions without necessarily including a visual representation of the dimensions and the causal relationships.

Relatedly, a "causal relationship" refers to a link or a connection between two dimensions that indicates causality or a causal effect from one dimension to another. For instance, a causal relationship includes a directionality or a flow of causality where one connected dimension causes (or contributes to the cause of) the other connected dimension. In some cases, a causal relationship can be quantified as a metric that measures the effect of a dimension value (or dimension) on the occurrence of a corresponding dimension value from a different dimension.

Additionally, as used herein, the term "causal contribution" refers to the contribution of a particular dimension or a particular dimension value to another dimension or another dimension value. For instance, a causal contribution can represent a contribution of a particular dimension value in terms of causing a dimension value within a multidimensional dataset. In particular, a causal contribution can refer to the contribution of a particular dimension value after accounting for the influence of one or more other dimension values within the multidimensional dataset on the particular dimension value.

In some embodiments, the causality-visualization system determines an uncertainty metric associated with a causal relationship between dimensions. As used herein, the term "uncertainty metric" (or sometimes simply "uncertainty") refers to a measure or a degree of confidence, probability, or a likelihood, that a determined causal relationship exists (or is correct) between two dimensions. For example, the causality-visualization system determines an uncertainty metric for a causal relationship between a first dimension and a second dimension that indicates a measure of confidence that the causal relationship actually exists.

In some embodiments, based on a causal graph, the causality-visualization system determines a layer to place a node within a causal-graph interface. A "layer" refers to a row or a level within a stratified or hierarchical representation of layered nodes. In some cases, a layer includes one of multiple layers arranged in a top-down fashion, where parent nodes in one or more higher layers causally contribute to child nodes in one or more lower layers. This disclosure provides additional examples of layers below with reference to FIGS. 2, 5A, 5B, and 6.

As further mentioned above, in one or more embodiments, the causality-visualization system generates and provides for display a causal-graph interface that includes layered nodes and uncertainty-aware-causal edges. As used herein, the term "layered node" (or simply "node") refers to a graphical node that depicts or represents a dimension and/or corresponding dimension values within a layered or stratified arrangement. For example, a layered node includes a graphical representation in the form of a glyph or a symbol that represents a given dimension within a particular layer (e.g., above and/or below other layers) of a causal graph. In some cases, a layered node has the appearance of a pie chart where the chart itself represents the dimension as a whole, and the individual sections of the pie chart represent the dimension values within the dimension.

As used herein, the term "causal edge" refers to a graphical representation or a depiction of a causal relationship between dimensions. For example, a causal edge links or connects nodes corresponding to respective dimensions. In addition, the causal edge indicates a causal relationship between the dimensions associated with the two connected nodes.

Relatedly, the term "uncertainty-aware-causal edge" refers to a graphical representation or a depiction of both a causal relationship between dimensions and an uncertainty metric associated with the causal relationship. For example, an uncertainty-aware-causal edge includes a graphical user interface element in the form of a line, a curve, or a spline that connects one or more nodes to one or more other nodes within a causal graph. In some cases, an uncertainty-aware-causal edge has a certain thickness or weight that indicates its uncertainty metric (e.g., where a thicker edge, a darker edge, a more opaque edge, or a particular color, or particular shade of color of the edge indicates a more certain causal relationship and a thinner edge indicates a less certain causal link).

As mentioned, in some embodiments, the causality-visualization system generates and provides a causal-graph interface that hides, or reduces the appearance of, cross-layer edges. As used herein, the term "cross-layer edge" refers to a causal edge or an uncertainty-aware-causal edge that connects nodes more than one layer apart. For example, within a causal-graph interface depicting three layers of nodes, a cross-layer edge connects a node in the top layer with a node in the bottom layer, crossing over the middle layer. In some cases, cross-layer edges cause visual confusion and difficulty in interpreting a causal graph quickly and accurately by overlapping (or crossing) other uncertainty-aware-causal edges and muddling the visual presentation of a causal graph.

When cross-layer edges have been hidden from view, in some embodiments, the causality-visualization system generates and provides a hidden-edge indicator to indicate the existence of a hidden cross-layer edge. As used herein, a "hidden-edge indicator" refers to a graphical object or a graphical element that indicates a hidden cross-layer edge. Indeed, in some embodiments, a hidden-edge indicator is selectable to view a corresponding hidden cross-layer edge. For instance, the causality-visualization system can add or present a hidden-edge indicator near, adjacent to, or with a layered node to graphically indicate a cross-layer edge has been hidden. Upon selection of the hidden-edge indicator, in some cases, the causality-visualization system presents the previously hidden cross-layer edge. In contrast to a cross-layer edge, a "neighboring-layer edge" refers to an uncertainty-aware-causal edge that connects nodes in neighboring or adjacent layers. For example, a neighboring-layer edge connects a parent node in a first layer with a child node in a second layer immediately below the first layer. Accordingly, a neighboring-layer edge does not cross over intermediate or middle layers to connect nodes separated by more than one layer.

Relatedly, the term "parent node" refers to a node representing a dimension (or dimension value) having causal relationships with one or more dimensions (or dimension values) represented by one or more descendant nodes or child nodes. For example, a parent node includes a node corresponding to a dimension having a direct causal contribution to another dimension represented by a child node. As noted above, in some cases, a parent node is arranged in one or more layers above a layer of its child node. The term "child node," on the other hand, refers to a node representing a dimension (or dimension value) having causal relationships with one or more dimensions (or dimension values) represented by parent nodes. For example, a child node refers to a node corresponding to a dimension that is caused at least in part by another dimension represented by a parent node. As noted above, in some cases, a child node is arranged in one or more layers below a layer of its parent node.

As further mentioned above, in one or more embodiments, the causality-visualization system performs attribution and intervention for dimensions corresponding to a causal graph. As used herein, the term "attribution" refers to an indication or a determination of causal contribution by one dimension (or dimension value) to another dimension (or another dimension value). For example, determining an attribution for a given dimension includes determining proportions or percentages of causal contributions associated with other dimensions that result in, or cause, the given dimension in respective amounts.

In addition, the term "intervention" refers to a process of modifying a causal graph to simulate an effect of a particular dimension value (or dimension) on one or more other dimension values (or dimensions). In particular, an intervention can refer to a process of modifying a causal graph to generate an interventional graph that corresponds to a particular dimension value. For example, an intervention can include a process of modifying a dimension value (e.g., by setting a dimension value to zero) and constructing another causal graph based on the modified dimension value. As a further example, an intervention can include a process of modifying a causal graph by removing directed edges coming into a node of the causal graph that represents a dimension associated with the particular dimension value and setting the node as equal to the dimension value. Based on an intervention and corresponding change in dimension value, the causality-visualization system can determine, project, or predict changes to one or more dimension values of a given dimension. For example, based on an intervention to modify a dimension value the causality-visualization system can predict changes to other dimensions and/or dimension values that would result from the proposed modification (e.g., in a what-if prediction).

As mentioned above, the causality-visualization system determines causality between dimensions of a multidimensional dataset. As used herein, the term "multidimensional dataset" refers to a dataset that includes more than one dimension. In particular, a multidimensional dataset can refer to a set of digital data representing a plurality of dimension values across multiple dimensions. In some cases, a multidimensional dataset includes observational data collected or gathered as part of a digital content campaign, an educational study, a medicinal study, or any other category of data. For instance, a multidimensional dataset includes a set of digital-content-campaign data having various dimensions relating to digital content and user actions in reaction to digital content. As another example, a multidimensional dataset includes medicinal data including dimensions relating to symptoms, treatments, and other medicine-related information.

Additional detail regarding the causality-visualization system will now be provided with reference to the figures. For example, FIG. 1 illustrates a schematic diagram of an example system environment for implementing a causality-visualization system 102 in accordance with one or more embodiments. An overview of the causality-visualization system 102 is described in relation to FIG. 1. Thereafter, a more detailed description of the components and processes of the causality-visualization system 102 is provided in relation to the subsequent figures.

As shown in FIG. 1, the environment includes server(s) 104, a client device 108, a database 114, and a network 112. Each of the components of the environment communicate via the network 112, and the network 112 is any suitable network over which computing devices communicate. Example networks are discussed in more detail below in relation to FIG. 12.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 12. Although FIG. 1 illustrates a single client device 108, in some embodiments, the environment includes multiple different client devices, each associated with a different user (e.g., digital-content-campaign administrator, educational information manager, or medicinal information manager).

The client device 108 communicates with the server(s) 104 via the network 112. For example, the client device 108 receives user input from a user interacting with the client device 108 (e.g., via the client application 110) to, for instance, generate a causal graph, generate a causal-graph interface, or to determine an attribution or perform an intervention for a particular dimension corresponding to a layered node of a causal graph. Thus, the causality-visualization system 102 on the server(s) 104 receives information or instructions to generate a causal-graph interface including a layered nodes representing dimensions from a multidimensional dataset stored within the database 114 and/or to determine an attribution or perform an intervention based on the input received by the client device 108.

As shown in FIG. 1, the client device 108 includes a client application 110. In particular, the client application 110 comprises a web application, a native application installed on the client device 108 (e.g., a mobile application, a desktop application, etc.), or a cloud-based application where all or part of the functionality is performed by the server(s) 104. Through the client application 110, the client device 108 presents or displays information to a user, including a causal-graph interface including layered nodes and uncertainty-aware-causal edges, a dimension view interface depicting the various dimensions of an illustrated causal graph, and a table view of dimension values for a specific (e.g., user-selected) dimension. A user interacts with graphical user interfaces of the client application 110 to provide user input to perform operations as mentioned above, such as requesting generation of a causal graph, selecting a particular layered node to identify dimension values associated with the dimension corresponding to the layered node, and/or requesting to perform an intervention or determine an attribution.

As further illustrated in FIG. 1, the environment includes the server(s) 104. The server(s) 104 generate, track, store, process, receive, and transmit electronic data, such as a causal graph for dimensions and dimensional values from multidimensional data and causal relationships among the dimensions. For example, the server(s) 104 receives data from the client device 108 in the form of a request to generate a causal-graph interface illustrating causal relationships between dimensions of multidimensional data. In addition, the server(s) 104 transmit data to the client device 108 to provide a causal-graph interface including layered nodes connected by uncertainty-aware-causal edges to thereby illustrate causal relationships as described herein. Indeed, the server(s) 104 communicates with the client device 108 to transmit and/or receive data via the network 112. In some embodiments, the server(s) 104 comprise a distributed server where the server(s) 104 include a number of server devices distributed across the network 112 and located in different physical locations. In some embodiments, the server(s) 104 comprise a content server, an application server, a communication server, a web-hosting server, a multidimensional server, or a machine learning server.

As shown in FIG. 1, the server(s) 104 also include the causality-visualization system 102 as part of an analytics system 106. The analytics system 106 communicates with the client device 108 to perform various functions associated with the client application 110, such as collecting, managing, and analyzing multidimensional data for dimensions and dimension values of digital content campaigns, educational information, medicinal studies, or other topics. For example, the causality-visualization system 102 communicates with the database 114 to access a repository of dimensions of multidimensional data. Indeed, as further shown in FIG. 1, the environment includes the database 114. In particular, the database 114 stores information, such as multidimensional data and various algorithms including a topological layout algorithm and a causality discovery algorithm.

Although FIG. 1 illustrates a particular arrangement of the environment, in some embodiments, the environment has a different arrangement of components and/or may have a different number or set of components altogether. For instance, in some embodiments, the causality-visualization system 102 is implemented by (e.g., located entirely or in part on) the client device 108 and/or a third-party device. In addition, in one or more embodiments, the client device 108 communicates directly with the causality-visualization system 102, bypassing the network 112. Further, in some embodiments, the database 114 is located external to the server(s) 104 (e.g., in communication via the network 112) or located on the server(s) 104 and/or on the client device 108.

Figure 2:
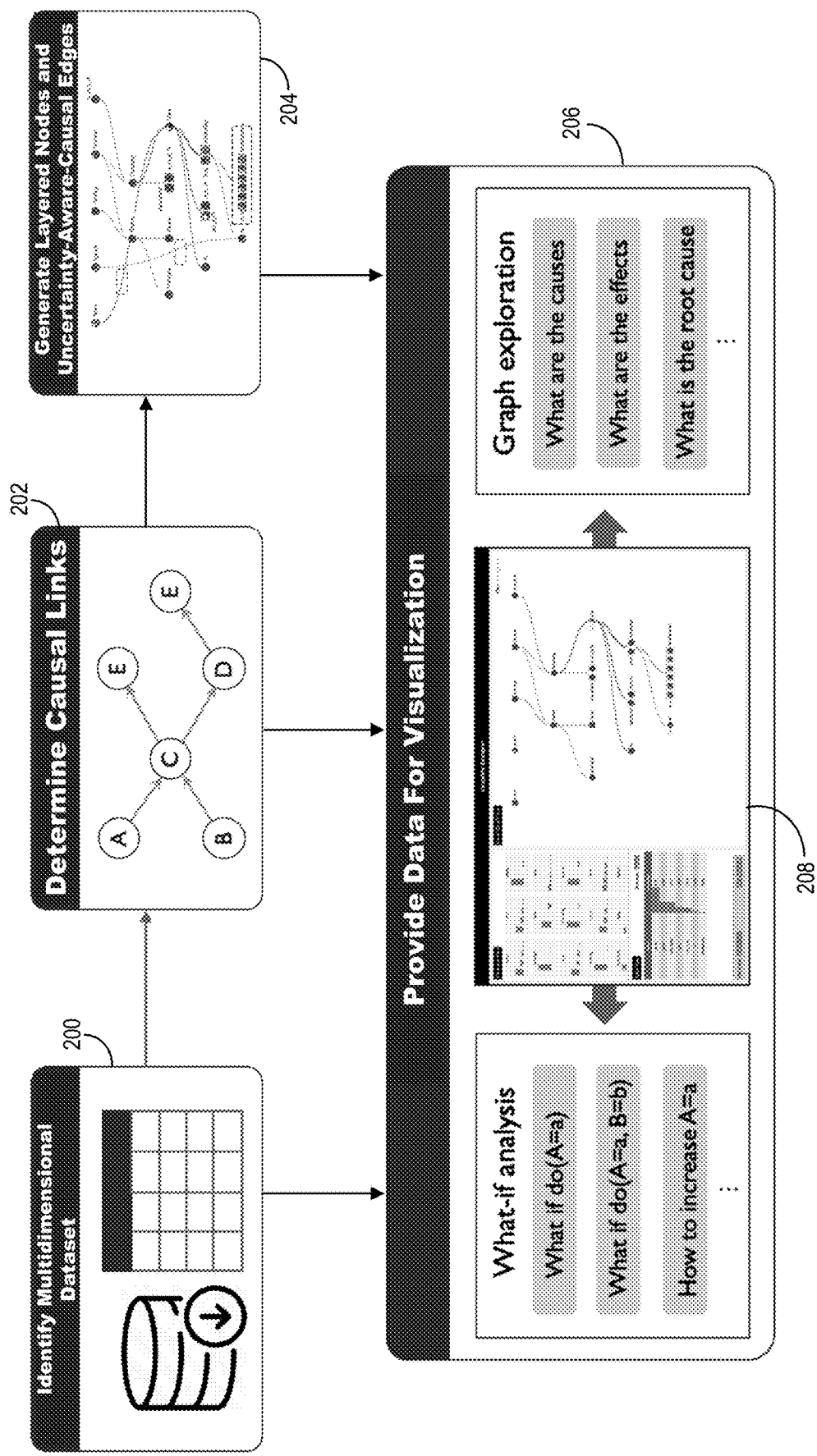
FIG. 2 illustrates an overview of a causality-visualization system generating and providing a causal-graph interface depicting causal relationships among dimensions and uncertainty metrics for such relationships in accordance with one or more embodiments.

As mentioned, in embodiments described herein, the causality-visualization system 102 generates a causal graph from dimensions of a multidimensional dataset and provides visualization tools for the causal graph. In particular, the causality-visualization system 102 generates and provides, for display on a client device, a causal-graph interface that includes visual representations of causal relationships and uncertainty metrics associated with dimensions of a multidimensional dataset. In accordance with one or more embodiments, FIG. 2 illustrates an example sequence of acts that the causality-visualization system 102 performs to determine and present causal relationships among dimensions of multidimensional data and uncertainty metrics for such relationships in a causal-graph interface. Additional detail regarding the various acts and associated graphical user interfaces is provided below with reference to subsequent figures.

As illustrated in FIG. 2, the causality-visualization system 102 performs an act 200 to identify a multidimensional dataset. In particular, the causality-visualization system 102 accesses a database (e.g., the database 114) to identify a multidimensional dataset that includes various dimensions and dimension values. For instance, the causality-visualization system 102 accesses a multidimensional dataset pertaining to a digital content campaign, educational information, or medicinal information. The causality-visualization system 102 thus accesses multidimensional data that includes a plurality of dimensions, each having its own constituent dimension values.

As further illustrated in FIG. 2, the causality-visualization system 102 performs an act 202 to determine causal relationships between dimensions of the multidimensional dataset and uncertainty metrics for the causal relationships. In particular, the causality-visualization system 102 generates a causal graph that indicates causal relationships between the various dimensions. As shown, the causality-visualization system 102 determines causal relationships such as a causal relationship from dimension "A" to dimension "C" and causal relationships from dimension "C" to dimensions "D" and "E." Thus, the causality-visualization system 102 generates a causal graph that includes the dimensions "A" through "E" and that indicates the causal relationships among them.

To determine the causal relationships for the causal graph, the causality-visualization system 102 utilizes a causality discovery algorithm. In particular, the causality-visualization system 102 utilizes a causality discovery algorithm to determine, detect, or discover causality between dimensions. For instance, the causality-visualization system 102 defines a causal graph with dimensions represented by nodes and causal relationships represented by edges. As mentioned, the causality-visualization system 102 further determines uncertainty metrics associated with causal relationships between dimensions. Additional detail regarding the causal discovery algorithm and generating a causal graph indicating causal relationships between dimensions is provided below with specific reference to FIG. 4.

As further shown in FIG. 2, the causality-visualization system 102 further performs an act 204 to generate layered nodes and uncertainty-aware-causal edges. More specifically, the causality-visualization system 102 generates nodes corresponding to dimensions of a multidimensional dataset. In addition, the causality-visualization system 102 arranges or places the nodes into layers in accordance with causal relationships among the dimensions (e.g., where parent nodes are placed above child nodes). For instance, the causality-visualization system 102 places nodes that have no parent nodes into a first layer and places additional nodes into layers beneath the first layer, where parent nodes are placed above child nodes in the arrangement. The causality-visualization system 102 also arranges nodes with no child nodes in leftmost positions within their respective layers. Additionally, the causality-visualization system 102 aggregates nodes in causal chains and hides cross-layer edges, as described in further detail below.

Further, the causality-visualization system 102 generates and provides uncertainty-aware-causal edges. In particular, the causality-visualization system 102 generates visualizations of causal relationships among dimensions in the form of uncertainty-aware-causal edges that connect the various nodes of the layered-node arrangement. The causality-visualization system 102 further generates the uncertainty-aware-causal edges to represent uncertainty metrics associated with respective causal relationships. For example, the causality-visualization system 102 generates uncertainty-aware-causal edges to have certain visual appearances (e.g., different thicknesses, colors, shades, or transparencies) that indicate uncertainty metrics of the indicated causal relationships.

As further illustrated in FIG. 2, the causality-visualization system 102 performs an act 206 to provide data for visualization. In particular, the causality-visualization system 102 provides data to the client device 108 to visualize or display a causal-graph interface 208 that includes visual depictions of layered nodes and uncertainty-aware-causal edges. For example, the causality-visualization system 102 causes the client device 108 to display layered nodes in a stratified arrangement with a number of layers (e.g., by sending instructions or data to the client device 108 to display layered nodes), where nodes in higher layers represent dimensions that causally contribute to (e.g., are parent nodes for) dimensions represented by nodes in lower layers. In addition, the causality-visualization system 102 further causes the client device 108 to display uncertainty-aware-causal edges among the layered nodes to indicate the causal relationships between corresponding dimensions (e.g., by sending instructions or data to the client device 108 to display uncertainty-aware-causal edges). The uncertainty-aware-causal edges further indicate uncertainty metrics associated with the causal relationships. Additional detail regarding display a causal-graph interface with layered nodes and uncertainty-aware-causal edges is provided below with reference to subsequent figures.

As further shown in FIG. 2, the causality-visualization system 102 provides additional tools for visualizing causal-graph information. For instance, the causality-visualization system 102 provides visualization tools to explore what-if scenarios, such as visualizations that show what would happen if a dimension value for a particular dimension was changed to a different value. In other words, visualizations in a graphical user interface that show what impact would a change have on dimension values of other dimensions. The causality-visualization system 102 provides intervention tools to generate predictions and to visualize these predictions as well. In addition to intervention tools, the causality-visualization system 102 also provides attribution tools for exploring causal contributions between dimensions. More specifically, for a given dimension, the causality-visualization system 102 determines a measure or a degree of causal contribution from one or more related dimensions in causing the given dimension. Additional detail regarding determining attribution, intervention, and providing data for visualizing attributions and interventions is provided below with reference to subsequent figures.

Figure 3:
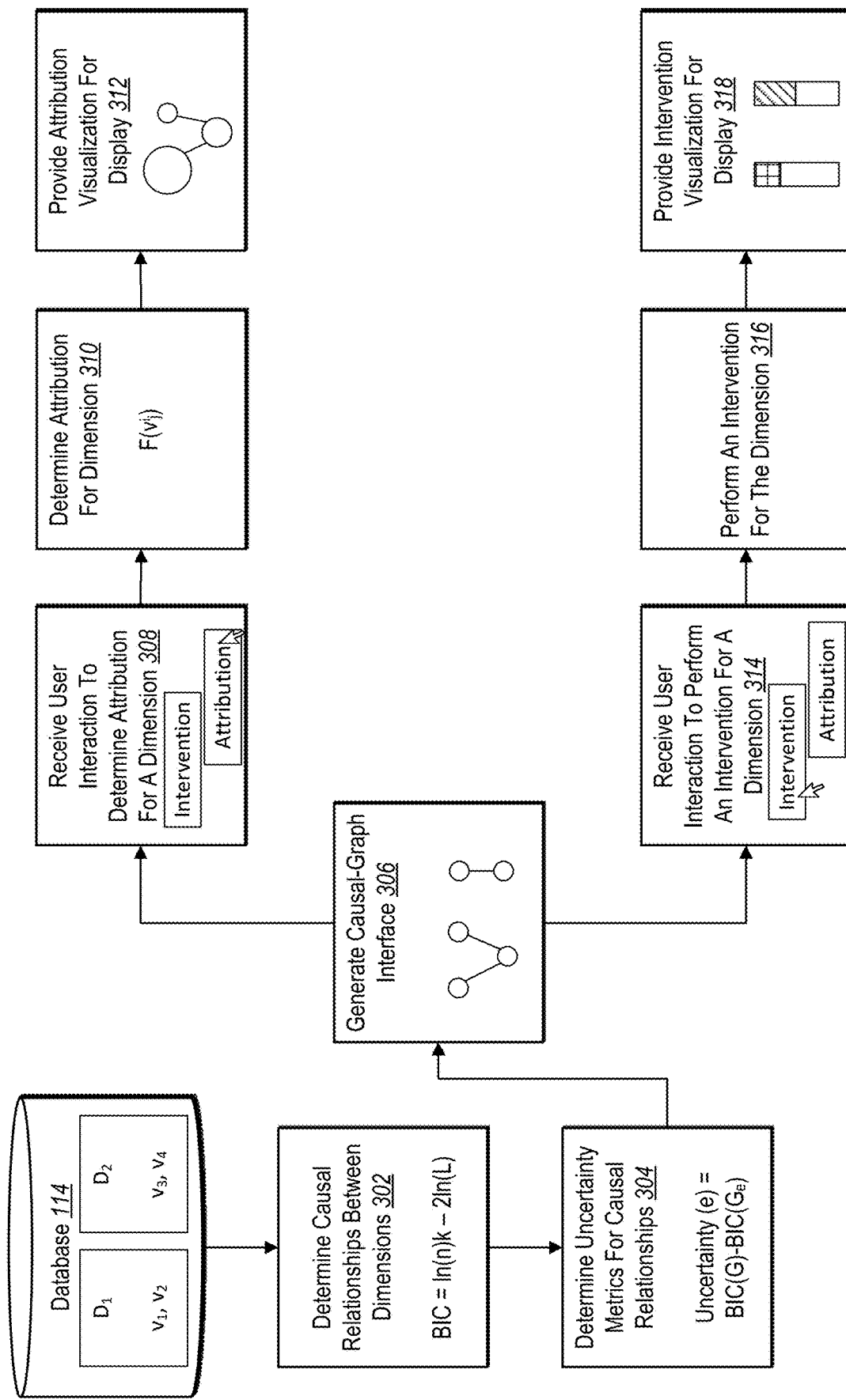
FIG. 3 illustrates an example sequence of acts for generating and providing visualizations for attributions and interventions in accordance with one or more embodiments.

As mentioned above, in certain embodiments, the causality-visualization system 102 generates and displays (or causes a client device to display) visual depictions of causal relationships, uncertainty metrics, interventions, and attributions. In particular, the causality-visualization system 102 generates a causal-graph interface that visually depicts causal relationships between dimensions as well as uncertainty metrics associated with the causal relationships using layered nodes and uncertainty-aware-causal edges. FIG. 3 illustrates a sequence of acts 302-318 for generating and providing a causal-graph interface for display, including visualizations for attribution and intervention, in accordance with one or more embodiments.

As illustrated in FIG. 3, the causality-visualization system 102 performs an act 302 to determine causal relationships between dimensions. In particular, the causality-visualization system 102 determines interdependence and/or independence among various dimensions, such as dimensions $D_1$ (which includes dimension values $v_1$ and $v_2$) and $D_2$ (which includes dimension values $v_3$ and $v_4$) from a multidimensional dataset within the database 114. For instance, the causality-visualization system 102 determines a degree or a measure of impact or cause of $D_1$ on $D_2$, or vice-versa, based on the dimension values $v_1$, $v_2$, $v_3$, and $v_4$. Additional detail regarding determining causal relationships between dimensions is provided below with specific reference to FIG. 4.

In addition, the causality-visualization system 102 performs an act 304 to determine uncertainty metrics associated with causal relationships. Particularly, the causality-visualization system 102 determines an uncertainty metric by determining a degree of confidence or a likelihood associated with a particular causal relationship that indicates how likely the causal relationship is to exist (or to be correctly identified). By determining uncertainty metrics, the causality-visualization system 102 reduces or eliminates false positives and provides a more accurate representation of causal relationships among dimensions than many conventional systems. Additional detail regarding determining uncertainty metrics is provided below with specific reference to FIG. 4.

As further illustrated in FIG. 3, the causality-visualization system 102 performs an act 306 to provide a causal-graph interface. More specifically, the causality-visualization system 102 provides a causal-graph interface that includes visual depictions of dimensions, causal relationships among dimensions, and uncertainty metrics associated with the causal relationships. Indeed, the causality-visualization system 102 generates and provides for display, a causal-graph interface that includes layered nodes connected by uncertainty-aware-causal edges. In some embodiments, the causality-visualization system 102 generates layered nodes to represent dimensions from the multidimensional dataset (e.g., $D_1$ and $D_2$).

The causality-visualization system 102 places or arranges (or causes the client device 108 to place or arrange) the nodes in layers according to causal relationships, where, in a top-down fashion, nodes in higher layers cause (or have causal contributions to) nodes in lower layers. The causality-visualization system 102 thus determines parent nodes that cause child nodes and places parent nodes in a layer above a layer associated with a child node. In some cases, a parent node is in a neighboring layer above a layer of a child node, while in other cases, a parent node may be more than one layer apart from a child node. In any event, the causality-visualization system 102 arranges the layered nodes in a stratified, top-down arrangement such that nodes in the topmost layer have no parent nodes (e.g., because the corresponding dimensions have no causal contributing dimensions), and where nodes in the bottommost layer (of a given causality chain) have no child nodes stemming from them (e.g., do not contribute to the cause of another node).

In addition, the causality-visualization system 102 visually presents (or causes the client device 108 to visually present) the uncertainty metrics within the causal-graph interface. Indeed, the causality-visualization system 102 generates and provides uncertainty-aware-causal edges to connect the layered nodes together to indicate both causal relationships as well as uncertainty metrics. For instance, the causality-visualization system 102 generates an uncertainty-aware-causal edge in the form of a line or a curve connecting a first node in a first layer to a second node in a second (e.g., lower) layer to thereby indicate causality from the first node to the second node.

Additionally, the causality-visualization system 102 generates the uncertainty-aware-causal edge to have a certain thickness to indicate, exhibit, or reflect an uncertainty metric associated with the causal relationship. For example, the causality-visualization system 102 represents a more certain causal relationship (e.g., a causal relationship with a lower uncertainty metric) with an uncertainty-aware-causal edge having a thicker or a heavier line or curve. Conversely, the causality-visualization system 102 represents a less certain causal relationship (e.g., a causal relationship with a higher uncertainty metric) with an uncertainty-aware-causal edge having a thinner or a lighter line or curve. Other example visualizations for different uncertainty metrics include different colors, different shades of color, different shades of lightness or darkness, or different transparencies.

In one or more embodiments, the causality-visualization system 102 generates cross-layer edges that indicate causal relationships for dimensions whose nodes are more than one layer apart within the layered arrangement. For example, the causality-visualization system 102 identifies a first node within a top layer that is connected via an uncertainty-aware-causal edge to a second node within a bottom layer, skipping over or crossing a middle layer. The causality-visualization system 102 further hides (or causes the client device 108 to hide) such cross-layer edges. In some cases, the causality-visualization system 102 provides only neighboring-layer edges for display within a causal-graph interface. In one or more embodiments, the causality-visualization system 102 provides data to cause the client device 108 to display a hidden-edge indicator (e.g., by a node) that indicates a location of a hidden cross-layer edge and that is selectable to view the cross-layer edge. Thus, the causality-visualization system 102 prevents or reduces the appearance of one or more cross-layer edges within a causal-graph interface displayed on the client device 108. By hiding cross-layer edges and providing hidden-edge indicators, the causality-visualization system 102 improves the visual clarity and usability of the causal-graph interface.

In some embodiments, the causality-visualization system 102 performs other improvements for the causal-graph as well (or in the alternative). For example, the causality-visualization system 102 not only arranges layered nodes in a top-down layer arrangement but also arranges nodes with no descendants (e.g., no child nodes or nodes with causal relationships connecting down to other nodes) in leftmost positions within their respective layers. For example, within a given layer of the layered nodes, the causality-visualization system 102 identifies a node that has no descendants. In addition, the causality-visualization system 102 places the node without descendants in a leftmost position within the layer. Thus, the causality-visualization system 102 arranges nodes within the layer in a fashion that reduces confusion and makes the causal relationships easier to identify.

As another example of improving a causal-graph interface, in some embodiments, the causality-visualization system 102 also aggregates nodes in causal chains. To elaborate, the causality-visualization system 102 identifies layered nodes corresponding to dimensions that are related or connected in a chain of one-to-one causal relationships, where one dimension connects to only one other dimension. In some cases, the top dimension (or the dimension corresponding to the top node) in a causal chain may have more than one parent node but has only one child node. Likewise, the child node (and any further child nodes stemming from the child node) contributes to zero or one additional child node. To aggregate nodes corresponding to dimensions in chains of one-to-one causal relationships, the causality-visualization system 102 groups (or causes the client device 108 to group) the nodes into a node group within a single layer. Thus, the causality-visualization system 102 condenses and clarifies the presentation of layered nodes for a more efficient, effective causal-graph interface.

As shown in FIG. 3, in certain implementations, the causality-visualization system 102 further performs an act 308 to receive a user interaction to determine an attribution for a dimension. More specifically, the causality-visualization system 102 receives an indication of a user input selecting a particular dimension for which to determine an attribution. In some embodiments, the causality-visualization system 102 receives a first user interaction selecting a particular dimension and further receives a second user interaction selecting an attribution element (or vice-versa) to trigger determining the attribution.

In response to receiving the user interaction, the causality-visualization system 102 performs an act 310 to determine the attribution for the selected dimension. In particular, the causality-visualization system 102 determines proportions or measures of causal contribution from one or more dimensions related (e.g., with causal relationships) to the selected dimension. In some embodiments, the causality-visualization system 102 determines a first causal contribution for a first related dimension and determines a second causal contribution for a second causal contribution. In the same or other embodiments, the causality-visualization system 102 determines causal contributions for dimensions that, when combined, account for or accumulate to one hundred percent of the causation of the selected dimension.

Based on determining an attribution for a selected dimension, the causality-visualization system 102 further performs an act 312 to provide an attribution visualization for display. More specifically, the causality-visualization system 102 provides data to the client device 108 that causes the client device 108 to display a visualization of the determined attribution for the selected dimension. For example, the causality-visualization system 102 causes the client device 108 to depict or present the attribution visualization within a causal-graph interface.

In one or more embodiments, to represent the attribution for the selected dimension, the causality-visualization system 102 provides data to cause the client device 108 to enlarge the appearance of layered nodes corresponding to related dimensions having larger causal contributions to the selected dimension. Along these lines, the causality-visualization system 102 also provides data to cause the client device 108 to shrink or reduce in size the appearance of layered nodes corresponding to related dimensions having smaller causal contributions to the selected dimension. Thus, the causality-visualization system 102 displays (or causes the client device 108 to display) larger-sized layered nodes corresponding to dimensions with greater contributions relative to layered nodes with smaller contributions.

As further shown in FIG. 3, in some embodiments, the causality-visualization system 102 further performs an act 314 to receive a user interaction to perform an intervention for a dimension. More specifically, the causality-visualization system 102 receives an indication of a user input selecting a particular dimension for which to perform an intervention. In some embodiments, the causality-visualization system 102 receives a first user interaction selecting a particular dimension and further receives a second user interaction selecting an intervention element (or vice-versa) to trigger performing the intervention. In these or other embodiments, the causality-visualization system 102 also receives user input to indicate a change to one or more dimension values of the selected dimension. For instance, the causality-visualization system 102 receives user input to increase a dimension value, to decrease a dimension value, to zero-out a dimension value, or to max-out a dimension value.

In response to the user interaction to perform the intervention, the causality-visualization system 102 performs an act 316 to perform an intervention for the selected dimension. More particularly, the causality-visualization system 102 generate predictions based on the changes indicated by the user input such as increases, decreases, zeroing-out, or maxing-out a given dimension value. Based on an indicated change to a given dimension value, the causality-visualization system 102 generates predicted changes to related dimension values of one or more dimensions related to the selected dimension that would result from the modification to the one or more dimension values from the user input. In some cases, the causality-visualization system 102 generates predicted changes, such as increases or decreases to certain related dimension values.

In addition, the causality-visualization system 102 performs an act 318 to provide an intervention visualization for display. In particular, the causality-visualization system 102 provides data to the client device 108 to reflect or exhibit predicted changes to dimension values based on the performed intervention. For instance, the causality-visualization system 102 causes the client device 108 to display, for a related dimension value with a predicted change, a hybrid graphical bar that includes a first section depicting an initial value of the related dimension value prior to the intervention and a second section depicting the predicted change to the related dimension value after the intervention. In some embodiments, the causality-visualization system 102 causes the client device 108 to present the second section of the hybrid graphical bar with a particular style, color, or shading to indicate an increase in the related dimension value or with a different style, color, or shading to indicate a decrease in the related dimension value. As another example of illustrating predicted changes, the causality-visualization system 102 generates an initial graphical bar that indicates an initial dimension value (e.g., before a requested change from user input) adjacent to a predicted graphical bar that indicates a predicted value for the dimension value after the requested change (e.g., larger or smaller than the initial graphical bar depending on predicted increases or decreases).

As mentioned above, in described embodiments, the causality-visualization system 102 generates a causal graph that indicates causal relationships between dimensions of a multidimensional dataset. In particular, the causality-visualization system 102 implements a causal discovery algorithm to detect, determine, or discover causal relationships between dimensions. In accordance with one or more embodiments, FIG. 4. illustrates a forward phase 402 and a backward phase 404 of a causal discovery algorithm implemented by the causality-visualization system 102.

Generally, the causality-visualization system 102 determines or discovers causal relationships between dimensions utilizing a causal discovery algorithm to test dependency of pairs of dimensions. For each possible pair of dimensions, in certain embodiments, the causality-visualization system 102 tests (n−2)! conditions (e.g., measures of dependency), where n represents the number of dimensions. In some embodiments, the causality-visualization system 102 defines a causal graph to determine causal relationships in accordance with the following definition:

$$G=(V,E)$$

where G represents a causal graph, V represents dimensions (corresponding to nodes), and E represents causal relationships (corresponding to causal edges).

For dimensions X, Y∈V, if X is the parent of Y, then X contributes to the cause of Y. On the other hand, if there is no causal relationship between X and Y, then X and Y are independent when other variables are controlled, as given by:

$$X \perp Y | Z, \exists Z \subseteq V_{\setminus\{X,Y\}}$$

where $V_{\setminus\{X,Y\}}$ represents all dimensions in V except for X and Y. For a causal graph with three dimensions $\langle X, Y, Z \rangle$, the absence of a causal relationship between X and Y means that X and Y are independent when conditioning on Z. Following this definition, the causality-visualization system 102 maps the causal graph G to a distribution $\hat{P}$ over V, where $\hat{P}$ is a joint distribution of dimensions in V. In some cases, $\hat{P}$ can be factorized as follows:

$$\hat{P} = \prod_{i=1}^{n} P(V_i | P_a(V_i))$$

where n is the total number of dimensions in V and $P_a(V_i)$ is the set of parent dimensions of (or dimensions with causal contributions to) the dimension $V_i$. Thus, the causal graph $\hat{G}$ is equal to the true causal graph G when its distribution $\hat{P}$ is equal to the real data distribution P.

To map a causal with the above definition, many conventional systems utilize conditional independence ("CI") tests to test dependency between dimensions. However, the time complexity of even a single CI test is O(m³), where m is the number of dimensions. With such time complexity, the CI test results in very time-consuming and expensive computations, especially over large datasets. In one or more embodiments, rather than using CI tests like many conventional systems use to determine causal relationships, the causality-visualization system 102 utilizes a more computationally efficient causal discovery algorithm.

Figure 4:
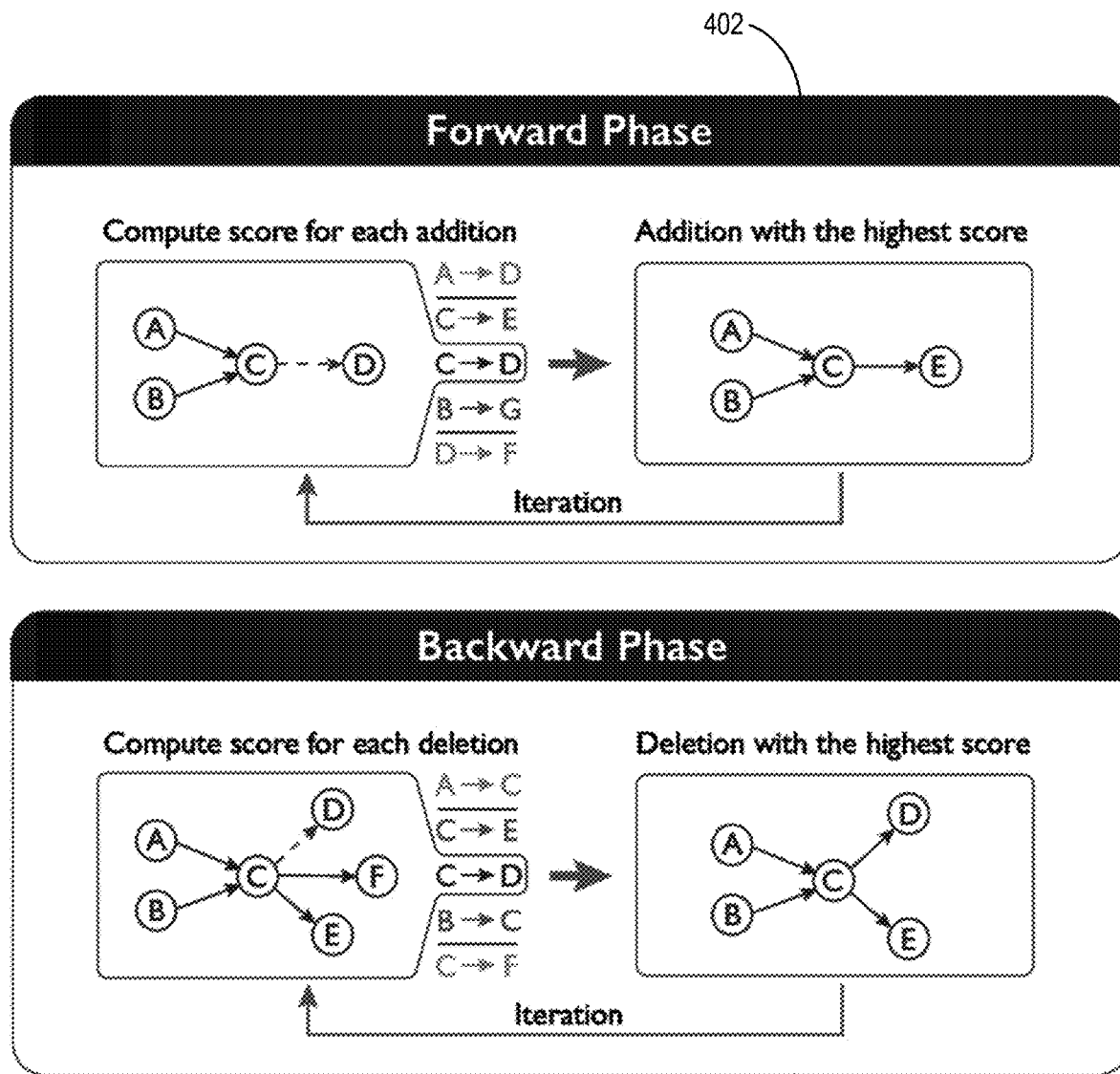
FIG. 4 illustrates causality-visualization system generating a causal graph in accordance with one or more embodiments.

As illustrated in FIG. 4, for instance, the causality-visualization system 102 utilizes a causality discovery algorithm having the forward phase 402 and the backward phase 404, such as a fast greedy equivalent search ("F-GES") algorithm. In some cases, the causality-visualization system 102 utilizes the F-GES causal discovery algorithm described by J. Ramsey, M. Glymour, R. Sanchez-Romero, and C. Glymour in *A Million Variables and More: The Fast Greedy Equivalence Search Algorithm for Learning High-Dimensional Graphical Causal Models, with an Application to Functional Magnetic Resonance Images*, Int'l Journal of Data Science and Analytics 121-29 (2017), which is incorporated herein by reference in its entirety.

As part of the forward phase 402, the causality-visualization system 102 iterates over every alternative one-relationship (or one-link) addition to the causal graph G. For example, as shown in FIG. 4, the causality-visualization system 102 adds a new causal relationship (as shown by the dashed arrow) from dimension "C" to dimension "D" and determines a score for the added causal relationship. Indeed, the causality-visualization system 102 determines causal-relationship scores for each causal relationship added while generating the causal graph G. In some cases, a causal-relationship score reflects or indicates a measure of how well the causal graph G fits the data distribution (e.g., the multidimensional dataset). In at least one embodiment, as part of the causal discovery algorithm (e.g., the F-GES), the causality-visualization system 102 determines a causal-relationship score in the form of a Bayesian information criterion ("BIC"). For instance, the causality-visualization system 102 generates a causal-relationship score given by:

$$BIC = \ln(n)k - 2\ln(L)$$

where n is the sample size (e.g., the number of dimensions in the multidimensional dataset), k is the number of parameters, and L=P(X|G) is the maximum likelihood.

The causality-visualization system 102 thus generates a causal-relationship score with two parts: (i) a penalty of the complexity of the causal graph structure, and (ii) a fitness between the causal graph and the data samples (e.g., additional dimensions). In some cases, the causality-visualization system 102 compares causal scores for each potential causal relationship by, as shown in FIG. 4, comparing the relationship from "A" to "D," the relationship from "C" to "E", the relationship from "C" to "D", the relationship from "B" to "G," the relationship from "D" to "F," and so on. In addition, the causality-visualization system 102 chooses or selects a causal relationship with a highest causal-relationship score to add to the causal graph G. As shown in the forward phase 402 of FIG. 4 for instance, the causality-visualization system 102 selects the causal relationship from "C" to "E" to add.

The causality-visualization system 102 further repeats the process of determining and comparing causal-relationship scores for multiple iterations. For instance, the causality-visualization system 102 repeats the process for as many iterations as required until no more added relationships improve an overall (e.g., an average) causal-relationship score for the causal relationships within the causal graph G. Based on determining that no more added causal relationships improve the score, the causality-visualization system 102 proceeds to the backward phase 404.

As indicated by FIG. 4, the causality-visualization system 102 implements the backward phase 404 to perform one-relationship (or one-link) deletions (as part of determining causal relationships between dimensions (as opposed to performing one-relationship additions for the forward phase 402). For instance, the causality-visualization system 102 identifies possible pairs of dimensions from the multidimensional dataset and determines causal-relationship scores between the pairs. As illustrated in FIG. 4, the causality-visualization system 102 determines causal-relationship scores (e.g., utilizing BICs) for the causal relationships connecting "A" to "C," "C" to "E," "C" to "B," "B" to "C," and "C" to "F."

After determining such causal-relationship scores, the causality-visualization system 102 compares the causal-relationship scores to identify a causal relationship with a highest causal-relationship score to remove from the causal graph G. As shown in FIG. 4, the causality-visualization system 102 identifies the causal relationship from "C" to "F" as the highest-scored causal relationship and thus removes it from the causal graph. The causality-visualization system 102 further repeats the backward phase 404 for multiple iterations until an overall (e.g., an average) causal-relationship score for the causal relationships within the causal graph G stops increasing.

With the forward phase 402 and the backward phase 404, the causality-visualization system 102 utilizes a causality discovery algorithm (e.g., an F-GES algorithm) to obtain or generate a causal graph that fits a data distribution of a multidimensional dataset without excessive overfitting. Indeed, the causality-visualization system 102 determines causal-relationship scores that are decomposable to allow parallel computation. In addition, the causality-visualization system 102 can reuse the computation result of a causal-relationship score for subsequent iterations. Thus, the causality-visualization system 102 utilizes a causality discovery algorithm that is more computationally efficient than those used by conventional systems (e.g., CI-based algorithms).

As a result, the causality-visualization system 102 achieves high scalability and increased flexibility for applications on larger datasets as compared to conventional systems.

Using the causality discovery algorithm alone leaves open the possibility of introducing false positives and inaccurately representation causality among dimensions. To resolve this issue, in some embodiments, the causality-visualization system 102 further determines an uncertainty metric for a given causal relationship. Particularly, the causality-visualization system 102 determines an uncertainty metric in accordance with an uncertainty-determination algorithm, as given by:

$$\text{Uncertainty}(e) = \text{BIC}(G) - \text{BIC}(G_e)$$

where e represents a causal relationship. Using the above uncertainty-determination algorithm, the causality-visualization system 102 compares a causal graph including the causal relationship e and a causal graph excluding the causal relationship e. For instance, the causality-visualization system 102 determines a difference in causal-relationship scores (e.g., average BIC scores) for a causal graph including the causal relationship e and a causal graph excluding the causal relationship e.

Figure 5A:
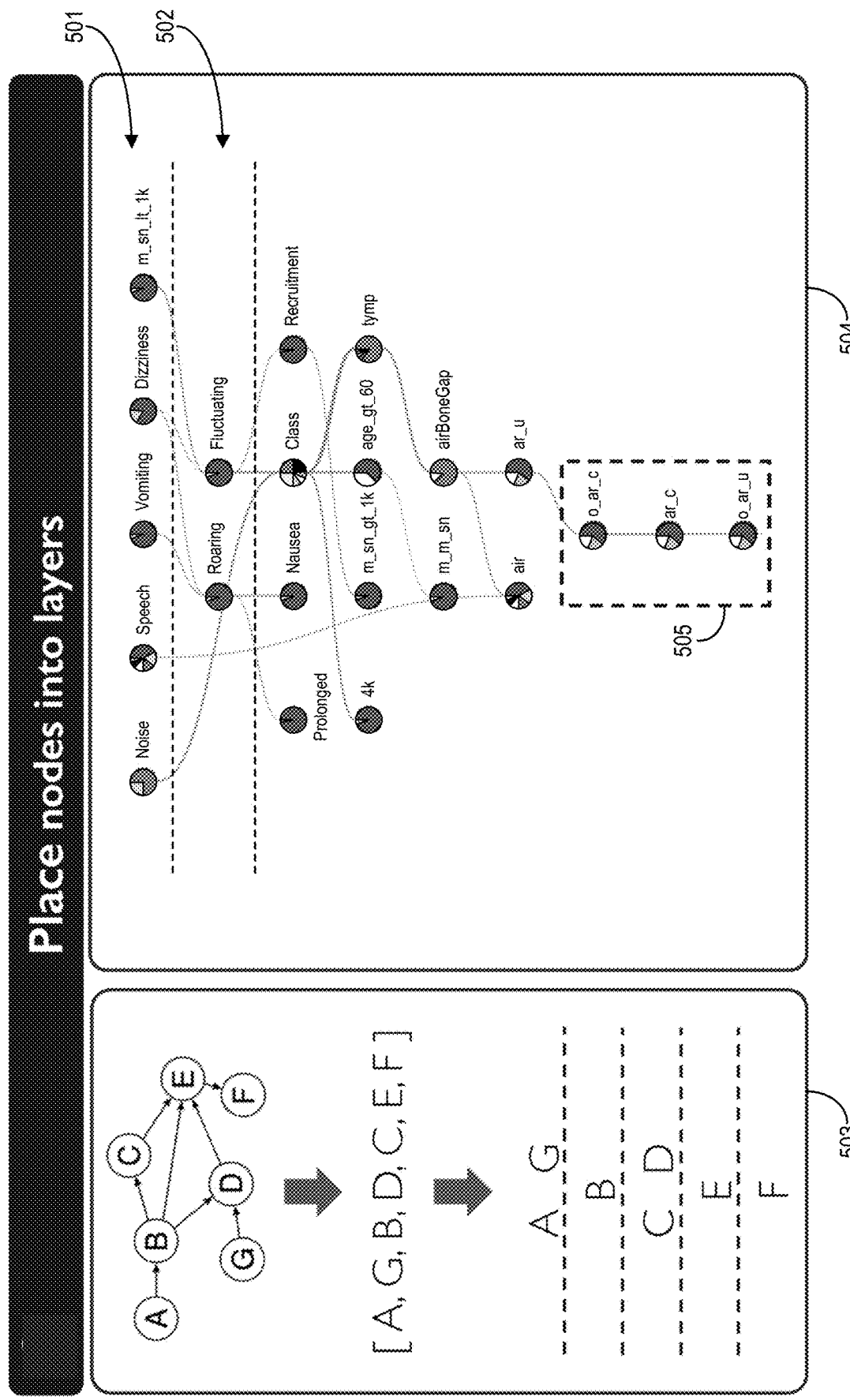
FIGS. 5A-5C illustrate an example sequence of acts for generating a causal-graph interface in accordance with one or more embodiments.
Figure 5B:
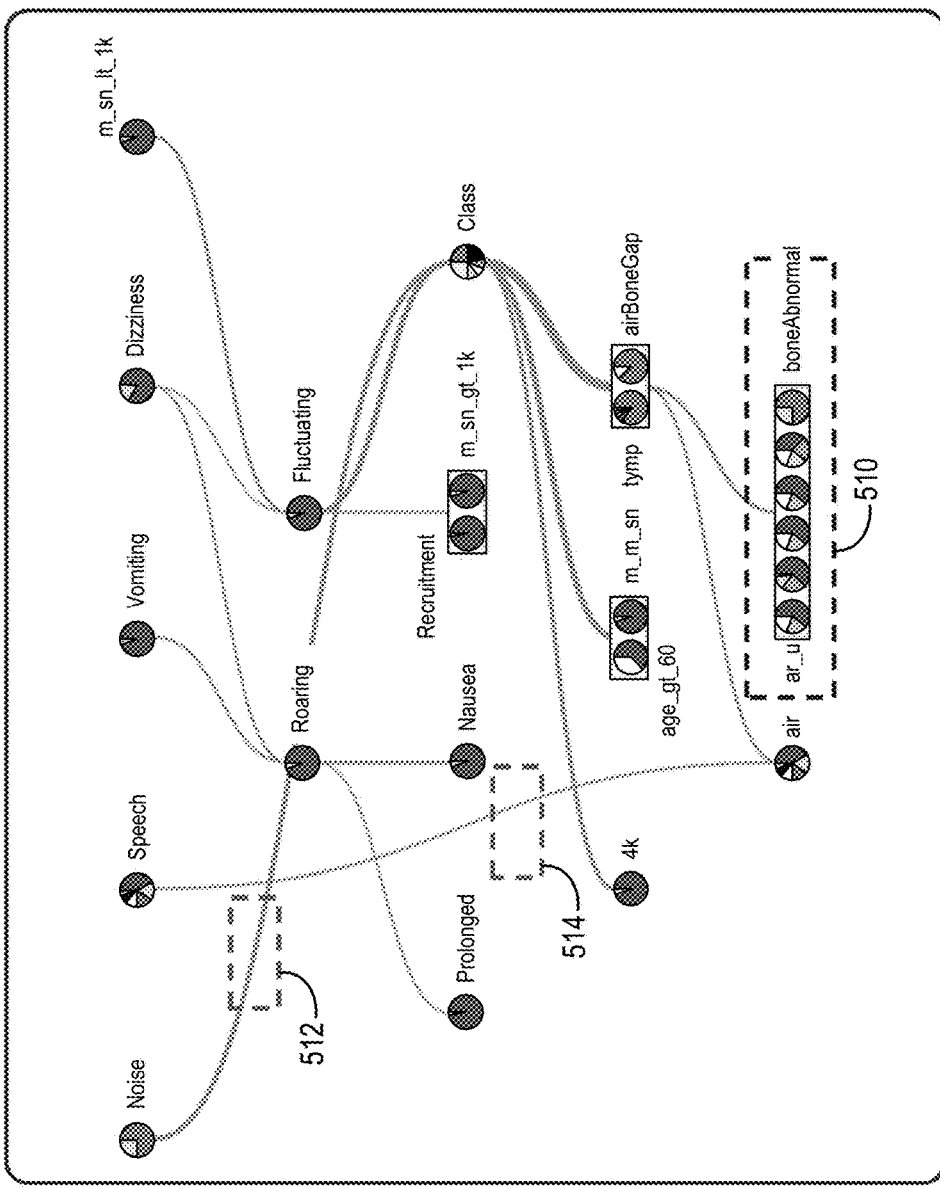
Figure 5C:
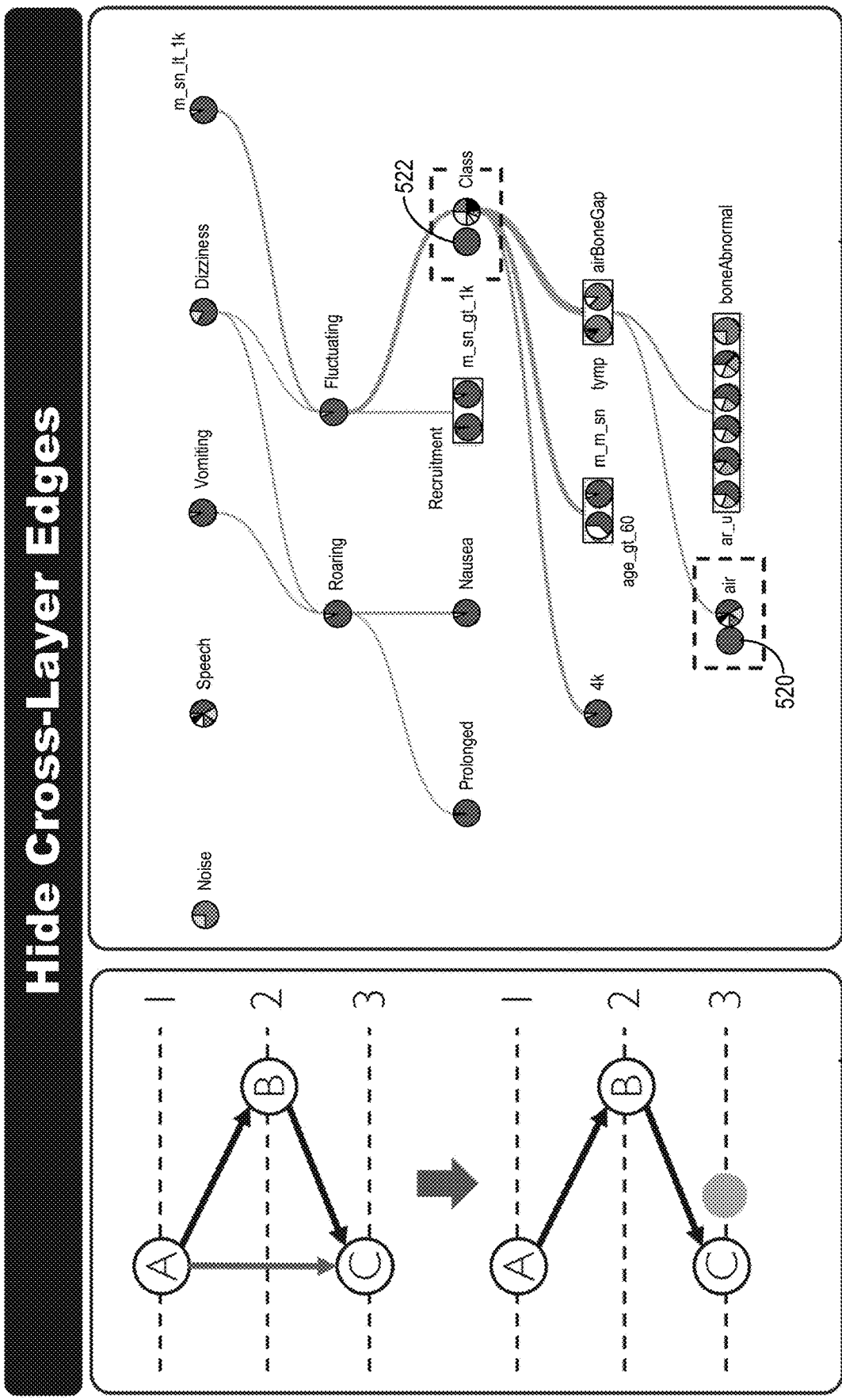

As mentioned above, in certain embodiments, the causality-visualization system 102 generates layered nodes arranged in a top-down fashion according to a direction of causality. In particular, the causality-visualization system 102 generates and provides a visual representation of causal relationships and uncertainty among various dimensions using layered nodes and uncertainty-aware-causal edges. FIGS. 5A-5C illustrate a sequence of acts the causality-visualization system 102 performs to generate and arrange the layered nodes and the uncertainty-aware-causal edges in accordance with one or more embodiments.

As illustrated in FIG. 5A, the causality-visualization system 102 places nodes into layers. To elaborate, the causality-visualization system 102 generates nodes to represent dimensions from a multidimensional dataset and places the nodes into layers for a stratified, top-down arrangement. As shown in FIG. 5A, the causality-visualization system 102 presents (or causes the client device 108 to present) each layered node as a pie chart, where the chart as a whole represents a particular dimension and the individual sections indicate dimension values and their proportional makeup as part of the dimension. For instance, the "Noise" node is presented as a pie chart with two sections or segments that exhibit corresponding dimension values, where one dimension value makes up or defines roughly 75% of the "Noise" dimension, and the other dimension value makes up the remaining 25%. In some cases, the causality-visualization system 102 represents dimension values within or alongside nodes using different visualizations, such as by circle packing with individual circles representing individual dimension values within a larger node or by visualizing individual rings representing individual dimension values within a larger node.

In addition to portraying dimensions and dimension values with nodes, the causality-visualization system 102 further places nodes into layers. As shown by a node-layering example 503 in FIG. 5A, the causality-visualization system 102 arranges the nodes into respective layers. For example, the causality-visualization system 102 places nodes "A" and "G" in the topmost layer, followed by node "B" in the next layer, and so on until node "F" in the bottommost layer. More specifically, the causality-visualization system 102 identifies nodes "A" and "G" as nodes without parent nodes, where their respective dimensions do not have any contributing dimensions. Thus, the causality-visualization system 102 places "A" and "G" in the top layer. Additionally, the causality-visualization system 102 arranges the nodes "B," "C," "D," "E," and "F" such that all parent nodes for each respective node are in layers above the node itself. For instance, the causality-visualization system 102 determines a number of layers to include and further determines a layer placement for each node to have a unidirectional flow of causality from top to bottom. Thus, the causality-visualization system 102 arranges the layered nodes to prevent a parent node from appearing below any of its child nodes and to likewise prevent a child node from appearing above any of its parent nodes. As a result, causality flows only from the top layer to the bottom layer in the arrangement of layered nodes.

To determine the layers for placing each of the nodes, the causality-visualization system 102 determines a topological order associated with the nodes. More specifically, the causality-visualization system 102 determines a topological order utilizing a particular topological layout algorithm. In some embodiments, the causality-visualization system 102 utilizes a topological layout algorithm as given by:

$$\text{Layer}(N) = \text{Max}(\{\text{Layer}(N_i) | N_i \in C(N)\}) + 1$$

where N represents a node, and where C(N) represents all causes of the node N. In some cases, the causality-visualization system 102 sets the layer of each root node (e.g., a node with no parent nodes) to 0.

As illustrated in FIG. 5A, the causality-visualization system 102 generates the layered nodes in a stratified view 504 by placing nodes into layers such as layer 501 and layer 502. As an example, the causality-visualization system 102 arranges nodes corresponding to medicine-related dimensions, such as "Vomiting," "Nausea," and "Dizziness." Indeed, the causality-visualization system 102 determines layers for each of the illustrated nodes based on the causal relationships between the corresponding dimensions.

As further shown in FIG. 5A, the causality-visualization system 102 identifies a group of nodes 505 within a chain of one-to-one causal edges. For instance, the causality-visualization system 102 identifies a first node ("o_ar_c") connected as a parent node to a single second node ("ar_c") without any additional child nodes. Further, the causality-visualization system 102 determines that the second node is connected as a parent only to a third node ("o_ar_u") and to no additional child nodes. The causality-visualization system 102 thus identifies the group of nodes 505 as the chain of three nodes that includes only one-to-one causal links, where each node in the chain connects only to one child node and one parent node.

Based on identifying the group of nodes 505, the causality-visualization system 102 aggregates or arranges the nodes within the group of nodes 505 to place them in a single layer. Particularly, the causality-visualization system 102 identifies the chain of one-to-one causal edges that connects the group of nodes 505 and generates an aggregated node group within a single layer. FIG. 5B illustrates the causality-visualization system 102 aggregating nodes to generate an aggregated node group 510 in accordance with one or more embodiments.

As illustrated in FIG. 5B, the causality-visualization system 102 identifies a chain structure, such as the chain from "A" to "B" to "C" shown in a chain example 506. Because nodes "A," "B," and "C" are related to each other in a causal chain of one-to-one causal edges, the causality-visualization system 102 aggregates them together into a node group within a single layer.

As shown in the stratified view 508 of FIG. 5B, the causality-visualization system 102 aggregates the nodes within the group of nodes 505 (from FIG. 5A) into the aggregated node group 510 within a single layer. Specifically, the causality-visualization system 102 extracts a particular causal structure called a causal chain (e.g., a cascading chain of causality from node to node) from the causal graph G. By aggregating nodes in chains of one-to-one causal edges, the causality-visualization system 102 provides an efficient user interface that condenses information, making it even more practical and effective for visualizing large datasets. Indeed, rather than representing L nodes in a causal chain within L different layers, the causality-visualization system 102 reduces the number of layers (e.g., to 1) and condenses the information into a smaller space for easier visibility. These benefits are especially salient when screen size is limited, such as when displayed via mobile devices.

In some cases, the causality-visualization system 102 further determines or generates a name for the aggregated node group 510 (e.g., "boneAbnormal"). For instance, the causality-visualization system 102 receives an indication of user input to name the aggregated node group 510. In some examples, the causality-visualization system 102 automatically (e.g., without user input) generates the name for the aggregated node group 510 by processing the dimensions corresponding to the grouped nodes to identify a subject matter. In other examples, the causality-visualization system 102 selects a name of a node (e.g., a topmost node) within the aggregated node group 510 as the name for the aggregated node group 510.

As further illustrated in FIG. 5B, the causality-visualization system 102 identifies cross-layer edges 512 and 514 that connect nodes more than one layer apart. Because the cross-layer edges 512 and 514 connect nodes more than one layer apart, in some embodiments, the causality-visualization system 102 hides (or causes the client device 108 to hide) the cross-layer edges 512 and 514. FIG. 5C illustrates hiding cross-layer edges in accordance with one or more embodiments.

As illustrated in FIG. 5C, the causality-visualization system 102 hides or removes the cross-layer edges 512 and 514 from a stratified view 518. To hide the a cross-layer edge, the causality-visualization system 102 replaces the cross-layer edge with a hidden-edge indicator. Indeed, as shown in an edge-hiding example 516 of FIG. 5C, the causality-visualization system 102 replaces the cross-layer edge connecting "A" to "B" with a hidden-edge indicator in the form of a gray circle or dot next to node "C." For instance, the causality-visualization system 102 determines that node "A" is in a first layer and node "C" is in a third layer. Therefore, the nodes "A" and "C" are more than one layer apart, and the causal edge connecting them is a cross-layer edge. In one or more embodiments, the causality-visualization system 102 places the hidden-edge indicator adjacent to the child node of a cross-layer edge. In other embodiments, the causality-visualization system 102 places the hidden-edge indicator adjacent to the parent node of a cross-layer edge.

As shown in the stratified view 518 of FIG. 5C, the causality-visualization system 102 hides the cross-layer edges 512 and 514 by replacing them with hidden-edge indicators 520 and 522. Indeed, the causality-visualization system 102 hides the cross-layer edge 512 by generating, and providing for display, the hidden-edge indicator 522. The causality-visualization system 120 places the hidden-edge indicator 522 next to the "Class" node, which is the child node associated with the hidden cross-layer edge 512. In like manner, the causality-visualization system 102 generates and provides the hidden-edge indicator 520 in place of the cross-layer edge 514. As shown, the causality-visualization system 102 places the hidden-edge indicator 520 next to the "air" node, which is the child node associated with the hidden cross-layer edge 514.

In some embodiments, the causality-visualization system 102 receives an indication of a user interaction selecting a hidden-edge indicator. For example, the causality-visualization system 102 receives an indication of a click, a hover, a tap, or some other user input indicating a selection of the hidden-edge indicator 520. In response to the user interaction, the causality-visualization system 102 displays (or causes the client device 108 to display) the cross-layer edge 514 (from FIG. 5B). Similarly, the causality-visualization system 102 provides data to the client device 108 to present the cross-layer edge 512 in response to user interaction selecting the hidden-edge indicator 522.

Figure 6:
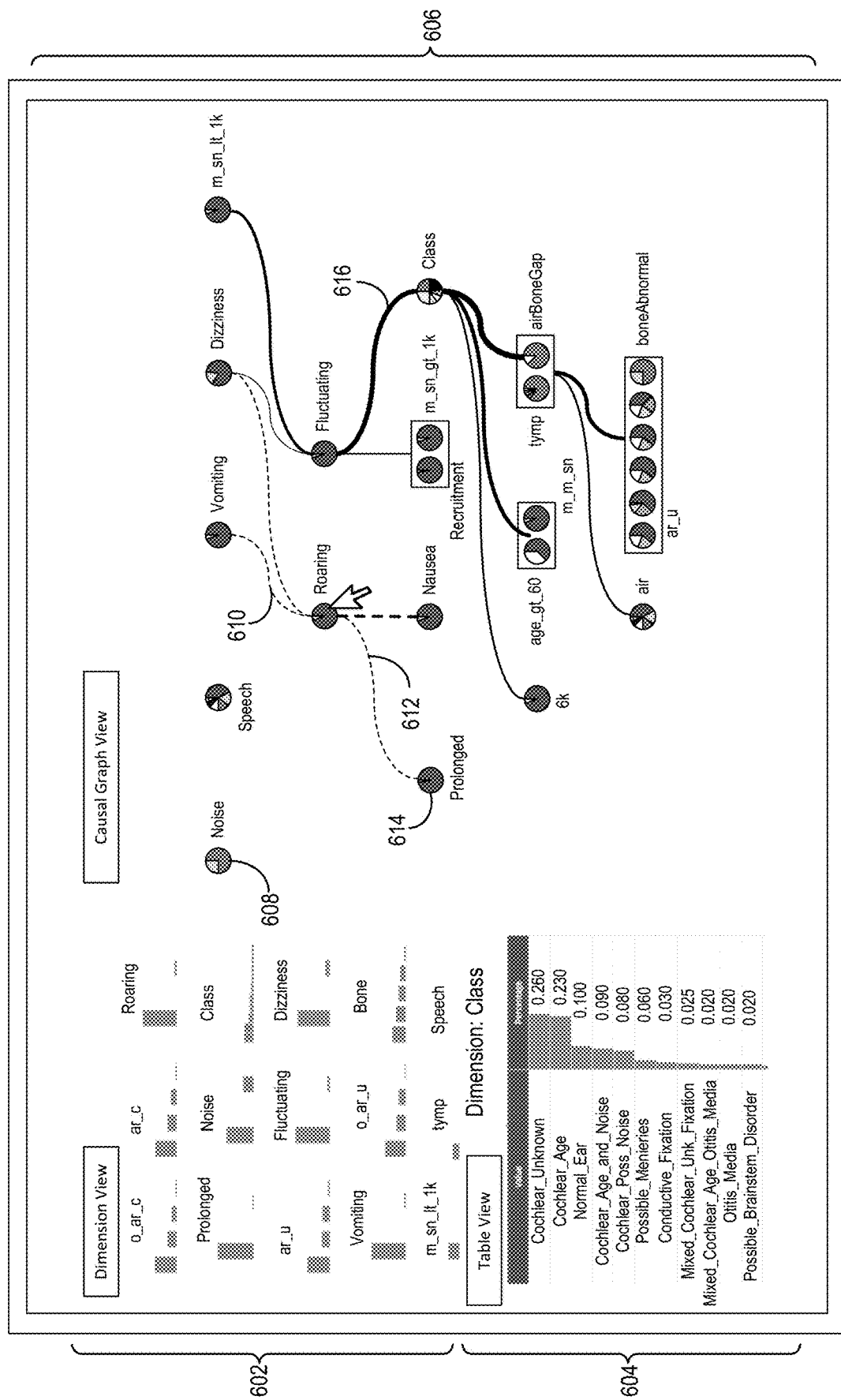
FIG. 6 illustrates an example causal-graph interface in accordance with one or more embodiments.

As mentioned above, in certain described embodiments, the causality-visualization system 102 generates and provides a causal-graph interface for display on a client device (e.g., the client device 108). In particular, the causality-visualization system 102 generates a causal-graph interface that depicts layered nodes and uncertainty-aware-causal edges to provide a visual depiction of causal relationships among dimensions of a multidimensional dataset and uncertainty metrics for the causal relationships. FIG. 6 illustrates the client device 108 displaying a causal-graph interface 606 in accordance with one or more embodiments.

As illustrated in FIG. 6, the client device 108 displays or presents the causal-graph interface 606 along with a dimension view 602 and a table view 604. To elaborate, the causal-graph interface 606 includes a stratified view of layered nodes, such as a node 608. Indeed, the node 608 corresponds to a "Noise" dimension and indicates two different dimension values making up the different sections or segments of the node 608.

As described above, the causality-visualization system 102 not only arranges the layered nodes in a layered, top-down fashion, but also places nodes with no descendants in leftmost positions within their respective layers. For example, the causality-visualization system 102 determines that a node 614 has no descendants (e.g., corresponds to a dimension that does not causally contribute to any other dimensions). Thus, the causality-visualization system 102 places the node 614 in the leftmost position within its layer within the causal-graph interface 606. In some embodiments, however, the causality-visualization system 102 places nodes (e.g., the node 614) with no child nodes in a rightmost position.

As indicated above, the causality-visualization system 102 can receive an indication of user selection of a particular node from the client device 108. As indicated by the location of the cursor in FIG. 6, the causality-visualization system 102 receives an indication from the client device 108 of (or the client device 108 detects) user selection of the "Roaring" node. For example, the causality-visualization system 102 receives an indication of a hover over the "Roaring" node, and in response, the causality-visualization system 102 animates (or causes the client device 108 to animate) the edges connected to the "Roaring" node.

To elaborate, the causality-visualization system 102 animates the uncertainty-aware-causal edge 610 and the uncertainty-aware-causal edge 612 to show movement or flow of causality to and from the selected "Roaring" node. For instance, the causality-visualization system 102 animates movement of the uncertainty-aware-causal edge 610 to depict causality flowing into the selected "Roaring" node from the "Vomiting" node in the layer above. Additionally, the causality-visualization system 102 animates movement of the uncertainty-aware-causal edge 612 to depict causality flowing from the "Roaring" node into the "Prolonged" node 614.

In addition to illustrating the directionality of causality from node to node via an animation, the causality-visualization system 102 further displays (or causes the client device 108 to display) uncertainty metrics within the causal-graph interface 606. In particular, the causality-visualization system 102 determines uncertainty metrics for causal relationships between dimensions and generates uncertainty-aware-causal edges having thicknesses reflecting the uncertainty metrics. As shown in FIG. 6, for example, the causality-visualization system 102 generates and provides for display the uncertainty-aware-causal edge 616 having a particular thickness or line weight. Compared to other uncertainty-aware-causal edges within the causal-graph interface, the uncertainty-aware-causal edge 616 is thicker, which indicates a more certain causal relationship (or a lower uncertainty metric) between the "Fluctuating" dimension and the "Class" dimension. Indeed, the causality-visualization system 102 determines a more certain causal relationship between the "Fluctuating" dimension and the "Class" dimension than, for example, between the "Class" dimension and the "6 k" dimension (where the uncertainty-aware-causal edge is thinner.

In one or more embodiments, the causality-visualization system 102 presents (or causes the client device 108 to present) depictions of uncertainty-metrics with visualizations other than (or in addition to) uncertainty-aware-edge thickness. For instance, the causality-visualization system 102 utilizes different colors, differences in lightness or darkness, and/or differences in transparency of uncertainty-aware-causal edges to represent corresponding uncertainty metrics. As an example, the causality-visualization system 102 provides data to the client device 108 to display a less transparent (e.g., more opaque) uncertainty-aware-causal edge for a more certain causal relationship and a more transparent uncertainty-aware-causal edge for a less certain causal relationship.

As also shown in the causal-graph interface 606, the causality-visualization system 102 aggregates nodes in causal chains into single-layer node groups. In some cases, the causality-visualization system 102 indicates (or causes the client device 108 to indicate) node groups of aggregated nodes by placing the nodes adjacent to each other and placing a box around them. In one or more embodiments, the causality-visualization system 102 receives an indication of a user interaction to select an aggregated node group from the client device 108, and in response, the causality-visualization system 102 presents (or causes the client device 108 to present) a breakdown of the chain of one-to-one causal relationships among the nodes.

As further illustrated in FIG. 6, the dimension view 602 includes alternative graphical representations of the dimensions corresponding to the layered nodes within the causal-graph interface 606. For example, the dimension view 602 includes bar graphs representing dimension values and their respective magnitudes within each of the dimensions. As shown, the dimension "Noise" includes two dimension values, one with a larger magnitude than the other, as reflected by both the bar graphs in the dimension view 602 as well as the node 608 within the causal-graph interface 606.

As also illustrated in FIG. 6, the table view 604 includes details regarding the various dimension values of a particular (e.g., selected) dimension. For example, the table view 604 illustrates a breakdown of the dimension values within the "Class" dimension, including names of the dimension values (e.g., "Cochlear_Unknown" and "Cochlear_Age") and their respective percentages of the makeup of the "Class" dimension. For example, the "Cochlear_Unknown" dimension value makes up 26% (or 0.260) of the "Class" dimension. Indeed, the causality-visualization system 102 modifies (or causes the client device 108 to modify) the table view 604 to display dimension values of whatever dimension a user selects, either from the dimension view 602 or from the causal-graph interface 606.

Figure 7A:
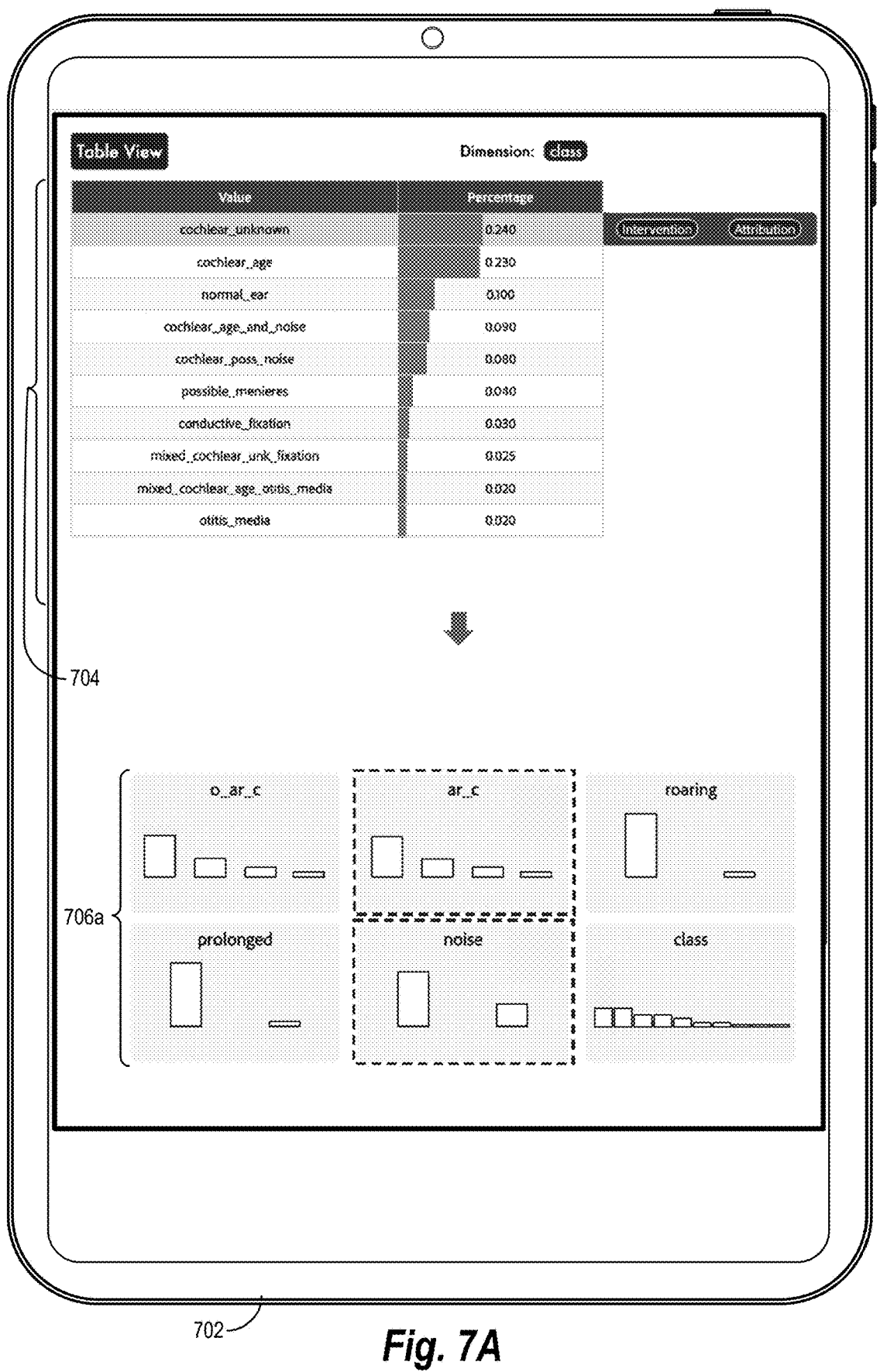
FIGS. 7A-7B illustrate an example visualization of an intervention in accordance with one or more embodiments.

As mentioned above, in certain described embodiments, the causality-visualization system 102 performs an intervention for a dimension of a multidimensional dataset. In particular, the causality-visualization system 102 receives an indication of a user interaction requesting an intervention to predict changes to dimension values that would result from a user-entered change to a selected dimension value. In accordance with one or more embodiments, FIG. 7A illustrates a client device 702 (e.g., the client device 108) displaying a visual representation of a table view for a dimension value and a dimension view for various related dimensions prior to performing an intervention. By contrast, in accordance with one or more embodiments, FIG. 7B illustrates the client device 702 displaying a visual representation of a table view for a dimension value and a dimension view for various related dimensions after performing an intervention.

As illustrated in FIG. 7A, the client device 702 displays a table view 704 of the "class" dimension. Indeed, the table view 704 includes measures or percentages of dimension values that make up the "class" dimension. In addition, the client device 702 displays an initial intervention view 706a that includes a set of bar graphs indicating magnitudes of dimension values within dimensions causally related to the "class" dimension. Indeed, the causality-visualization system 102 identifies a set of related dimensions that have causal relationships to and/or from the selected "class" dimension and provides a visual representation of their respective dimension values within the initial intervention view 706a.

Figure 7B:
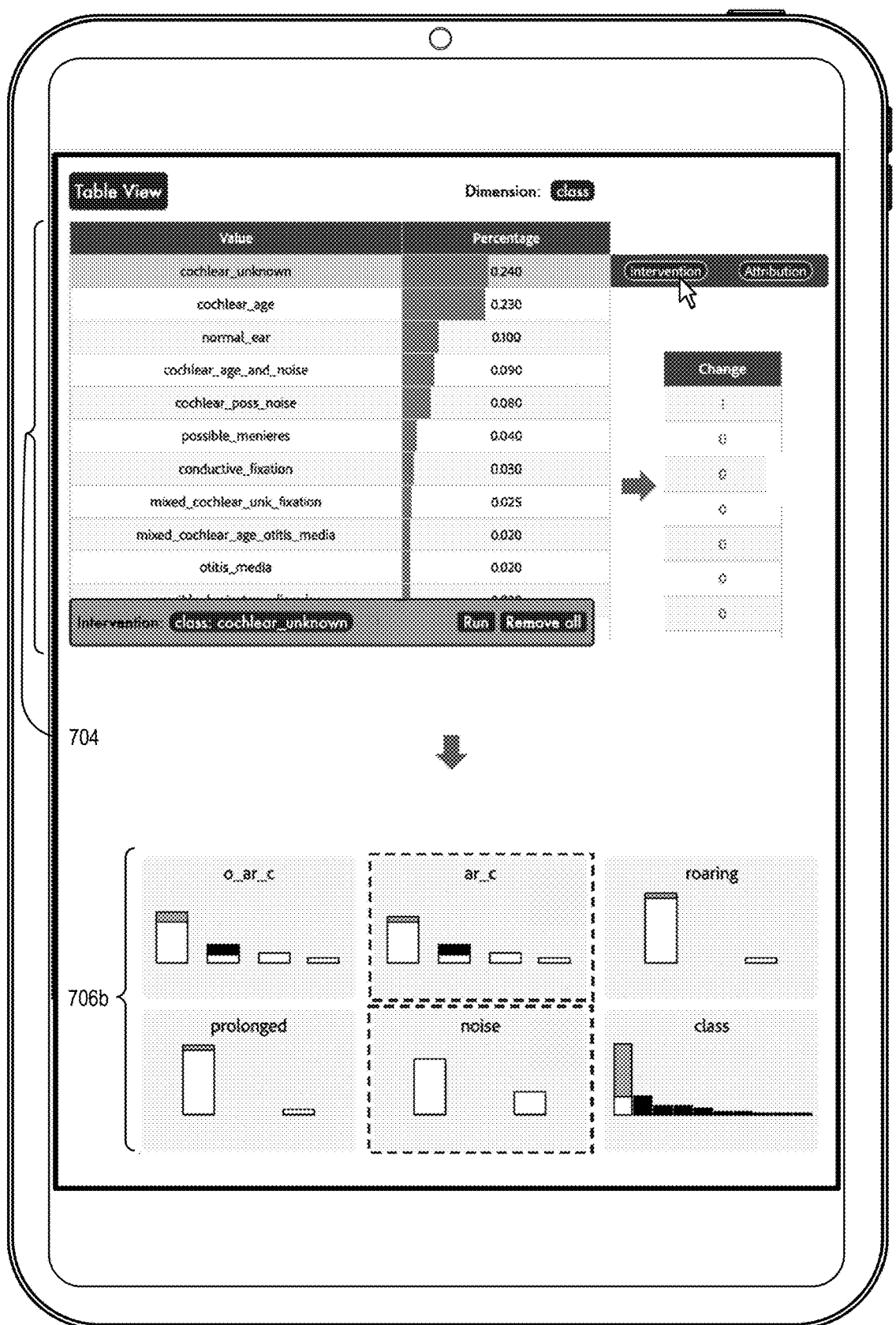

As illustrated in FIG. 7B, the client device 702 displays the table view 704 for the "class" dimension along with a modified intervention view 706b. Within the modified intervention view 706b, the client device 702 displays predicted changes or modifications to dimension values of dimensions related to the "class" dimension (e.g., the "roaring" dimension and the "ar_c" dimension). As shown in the modified intervention view 706b, the client device 702 displays hybrid graphical bars that include various sections. For example, looking to the "ar_c" portion of the modified intervention view 706b, the leftmost hybrid graphical bar includes a first section depicting an initial value of the related dimension value prior to an intervention (e.g., the white portion) and further includes a second section depicting a predicted change to the related dimension value as a result of the intervention (e.g., the gray portion). As shown in FIG. 6B, the sections of the hybrid graphical bars that are gray represent predicted increases to the various related dimension values, while the sections that are black represent predicted decreases to the various related dimension values.

To generate the predicted changes to the related dimension values, as reflected by the various sections of the hybrid graphical bars, the causality-visualization system 102 determines an intervention based on a user-indicated change to a particular dimension value. Indeed, the causality-visualization system 102 receives an indication of user input to request an intervention (e.g., as shown by the cursor location over the "Intervention" element in FIG. 7B), and in response, the causality-visualization system 102 provides a graphical element (e.g., the "Change" table) for modifying one or more dimension values of the dimension shown in the table view 704. In some cases, the causality-visualization system 102 receives an indication of a user interaction to modify one or more of the dimension values and further generates predicted modifications to related dimension values based on the modified dimension value(s).

In one or more embodiments, the causality-visualization system 102 represents an intervention as a set of ⟨key, value⟩ pairs, where key represents a particular dimension value and value represents a magnitude or an amount associated with the particular dimension value. The causality-visualization system 102 generates a result of an intervention in the form of a set of distributions $\{d_1, d_2, \ldots, d_n\}$, where $d_i$ represents a distribution of dimension values within dimension In some cases, the causality-visualization system 102 interprets $d_i$ as the possible distribution of $V_i$ when fixing the magnitudes of dimension values according to the intervention. Thus, the causality-visualization system 102 generates $d_i^1$ and $d_i^2$ to represent the distributions before and after the intervention, respectively.

In certain embodiments, the causality-visualization system 102 generates a sample of a causal graph in the form of $\{v_1, v_2, \ldots, v_n\}$, where $v_i$ represents a dimension value of the dimension $V_i$. According to the causal graph, the causality-visualization system 102 samples $v_i$ from its conditional probability distribution ("CPD"), given by $P(V_i|\text{Parent}(V_i))$. The causality-visualization system 102 determines or predicts values of dimensions without any parents (e.g., root dimensions) by sampling over their probability distributions $P(V)$. Therefore, the causality-visualization system 102 obtains a sample of the causal graph by sampling dimensions following a topological order. For an intervention ⟨$V_j$, $v_j$⟩, the causality-visualization system 102 samples each dimension value from $P(V_i|\text{Parent}(V_i), V_j=v_j)$. The causality-visualization system 102 further repeats the sampling multiple times to determine new distributions for each dimension from a multidimensional dataset (or for each dimension related to a selected dimension). In some embodiments, the causality-visualization system 102 generates these distributions as the result of an intervention.

As illustrated in FIG. 7B, the causality-visualization system 102 receives user input to change a dimension value and further performs the intervention as described above. As shown, the causality-visualization system 102 receives an indication of user input to modify the "cochlear_unknown" dimension value within the "class" dimension. Based on the modification, the causality-visualization system 102 provides data to the client device 702 to display the results of the intervention using hybrid graphical bars with different sections.

In some embodiments, the causality-visualization system 102 identifies large numbers of related dimension values for dimensions, where displaying all of the predicted changes that result from an intervention would be difficult or impractical in a single graphical user interface. In these or other cases, the causality-visualization system 102 identifies a top number (e.g., a top 10) of dimension values to represent for a given dimension value. To provide details for predicted changes for all of the dimension values of a given dimension, the causality-visualization system 102 receives an indication of user selection of the dimension within the modified intervention view 706b. In turn, the causality-visualization system 102 causes the client device 702 to display the dimension values of the selected dimension within the table view 704, including predicted changes, for example, by sending instructions or data to the client device 702 to display the dimension values in table view.

While FIG. 7B illustrates one way to visually represent an intervention, in some embodiments, the causality-visualization system 102 utilizes alternative visualizations. For example, in some embodiments, the causality-visualization system 102 provides a superposition visualization where a first graphical bar indicates an initial magnitude of a dimension value and a second graphical bar indicates a predicted magnitude of the dimension value after the intervention. As another example, the causality-visualization system 102 provides an explicit-encoding visualization where a single graphical bar indicates a predicted modification to a dimension value, where a first shading (or color) indicates an increase and a second shading (or color) represents a decrease in the dimension value.

Figure 8A:
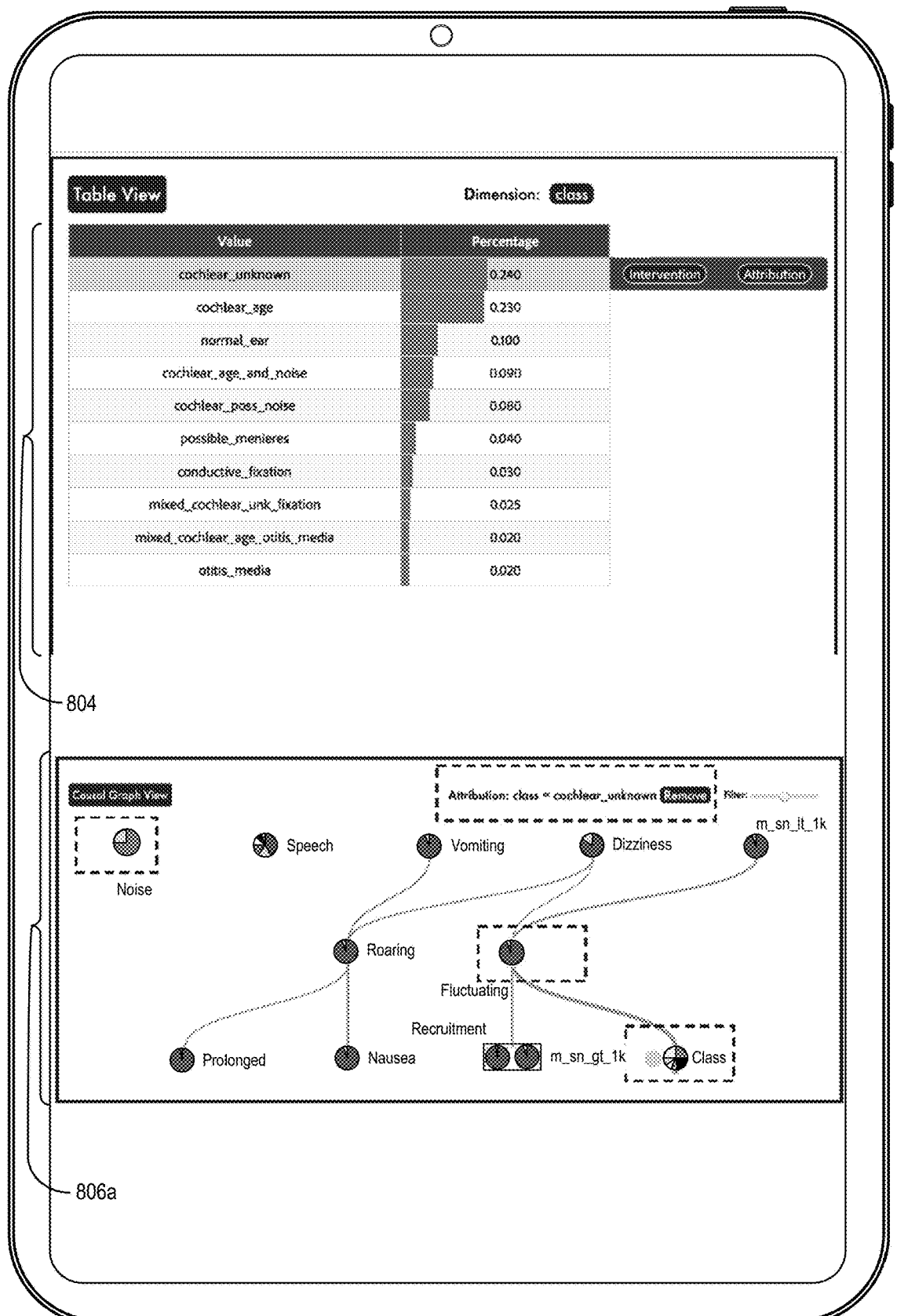
FIGS. 8A-8B illustrate an example visualization of an attribution in accordance with one or more embodiments.

As mentioned above, in some embodiments, the causality-visualization system 102 determines an attribution for a selected dimension. In particular, the causality-visualization system 102 receives an indication of a user interaction selecting a particular dimension to determine causal contributions of other dimensions to the selected dimension. In accordance with one or more embodiments, FIG. 8A illustrates a client device 802 (e.g., the client device 108) detecting a user selection of a dimension for which to determine an attribution. In accordance with one or more embodiments, FIG. 8B illustrates the client device 802 displaying a causal-graph interface that reflects an attribution for the selected dimension.

As illustrated in FIG. 8A, the client device 802 displays a table view 804 for a selected "class" dimension, including a breakdown of the various dimension values within the dimension. In addition, the client device 802 displays an initial causal-graph interface 806a that includes layered nodes and uncertainty-aware-causal edges for various dimensions, including the "class" dimension. Based on receiving an indication of the user interaction selecting the node for the "class" dimension, the causality-visualization system 102 causes the client device 802 to display the table view 804 for the "class" dimension, for example, by sending instructions or data to the client device 802 to display the dimension values in table view.

In addition, based on receiving an indication of user interaction selecting a particular dimension value from within the table view 804, the causality-visualization system 102 causes the client device 802 to display the selectable "Intervention" element and the selectable "Attribution" element. In response to user interaction selecting the "Attribution" element, the causality-visualization system 102 performs an attribution to determine causal contributions of related dimension values to the selected dimension value ("cochlear_unknown").

Figure 8B:
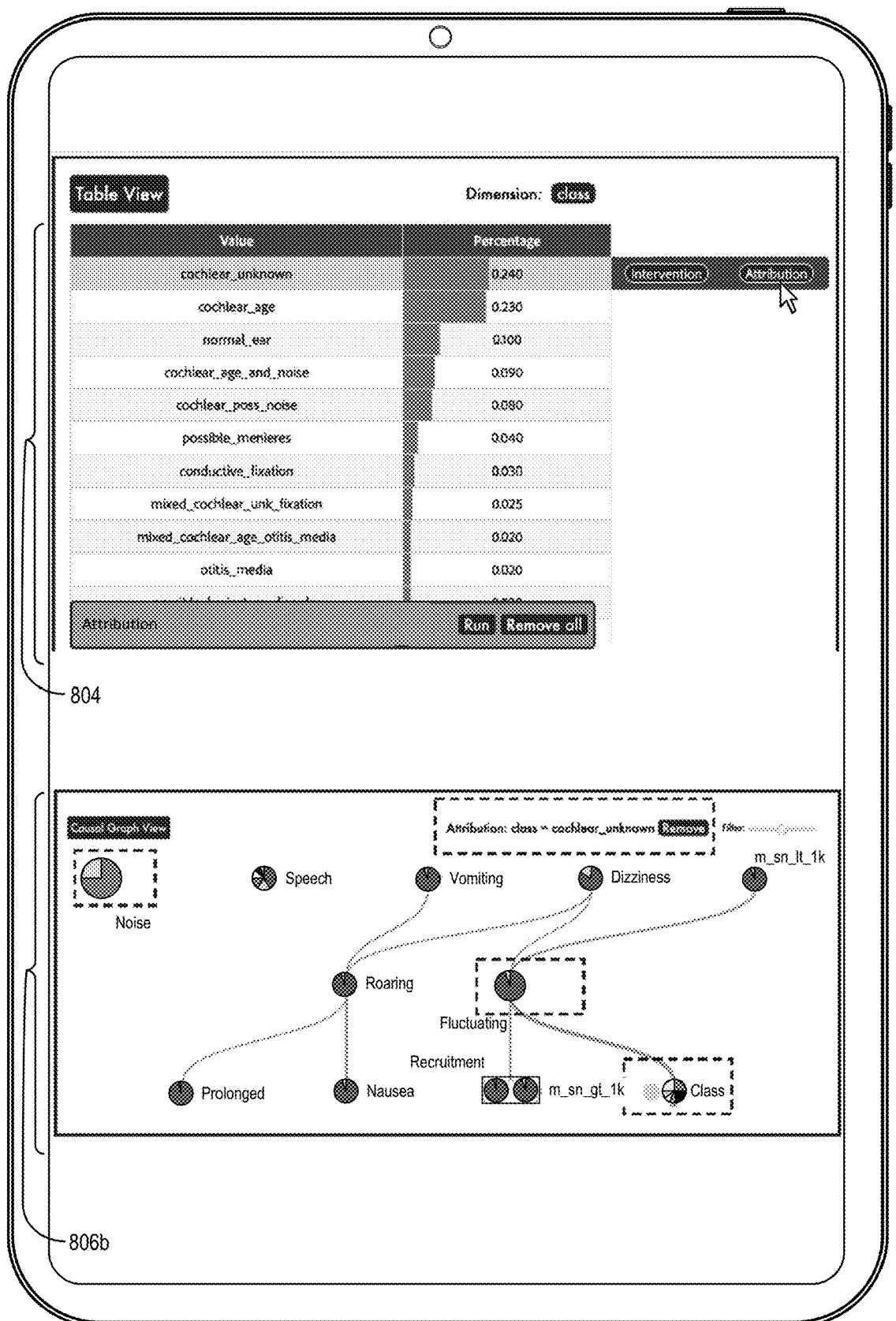

FIG. 8B illustrates the client device 802 displaying a modified causal-graph interface 806b that reflects an attribution. In particular, based on user interaction selecting the "Attribution" element, the causality-visualization system 102 causes the client device 802 to display the modified causal-graph interface 806b that includes nodes of varying sizes to represent the respective causal contributions of related dimensions (or their dimension values) to the selected dimension. Indeed, the causality-visualization system 102 modifies (or causes the client device 802 to modify) sizes of various layered nodes to indicate their respective causal contributions to the selected "class" dimension (or the selected "cochlear_unknown" dimension value). For example, a larger node indicates a dimension with a greater causal contribution than a smaller node.

To determine causal contributions for related dimensions or dimension values, the causality-visualization system 102 utilizes a particular attribution determination algorithm. In particular, given a dimension $V_t$ and one of its dimension values $v_j^t$, the causality-visualization system 102 determines an attribution by finding the effect other dimensions or dimension values have on the proportion of $v_j^t$. To determine this effect, or this causal contribution, the causality-visualization system 102 identifies, from a causal graph G, related dimension values with causal relationships to $v_j^t$, referred to as S. In some cases, the causality-visualization system 102 ignores unrelated dimensions or dimension values in determining an attribution for a selected dimension or a selected dimension value. With S, the causality-visualization system 102 implements an attribution determination algorithm for every $v_j^i$, as given by:

$$f(v_j^i) = \text{Abs}(P(v_j^t | \text{do}(V_i = v_j^i))) - P(v_j^t | \text{do}(V_i \neq v_j^i))$$

where $f(v_j^i)$ represents the causal contribution of $v_j^i$ on $v_j^t$, and where $P(v_j^t | \text{do}(X))$ represents the probability of $v_j^t$ when doing intervention X. Thus, the causality-visualization system 102 determines the causal contribution of a related dimension on a selected dimension value by identifying a related dimension value within the related dimension that has a highest causal contribution to the selected dimension value. In other words, the causality-visualization system 120 determines the causal contribution of $V_i$ on $v_j^t$ as $\text{Max}(\{f(v_j^i)\})$.

As illustrated in FIG. 8B, the causality-visualization system 102 determines a causal contribution of the selected "cochlear_unknown" dimension value associated with related dimensions, such as the "Noise" dimension and the "Fluctuating" dimension. As shown in the modified causal-graph interface 806, the causality-visualization system 102 enlarges (or causes the client device 802 to enlarge) the nodes for the "Noise" dimension and the "Fluctuating" dimension to reflect their respective causal contributions.

As further shown in FIG. 8B, the nodes for "Noise" and "Class" are connected by a cross-layer edge, which is hidden and replaced with a hidden-edge indicator in the form of a gray dot next to the "Class" node. As indicated, the node for the "Fluctuating" dimension is slightly larger, and the node for the "Noise" dimension is significantly larger. Thus, the modified causal-graph interface 806 indicates a larger causal contribution for the "Noise" dimension than for the "Fluctuating" dimension, which in turn has a larger causal contribution than the "Dizziness" dimension (or other dimensions).

Figure 9:
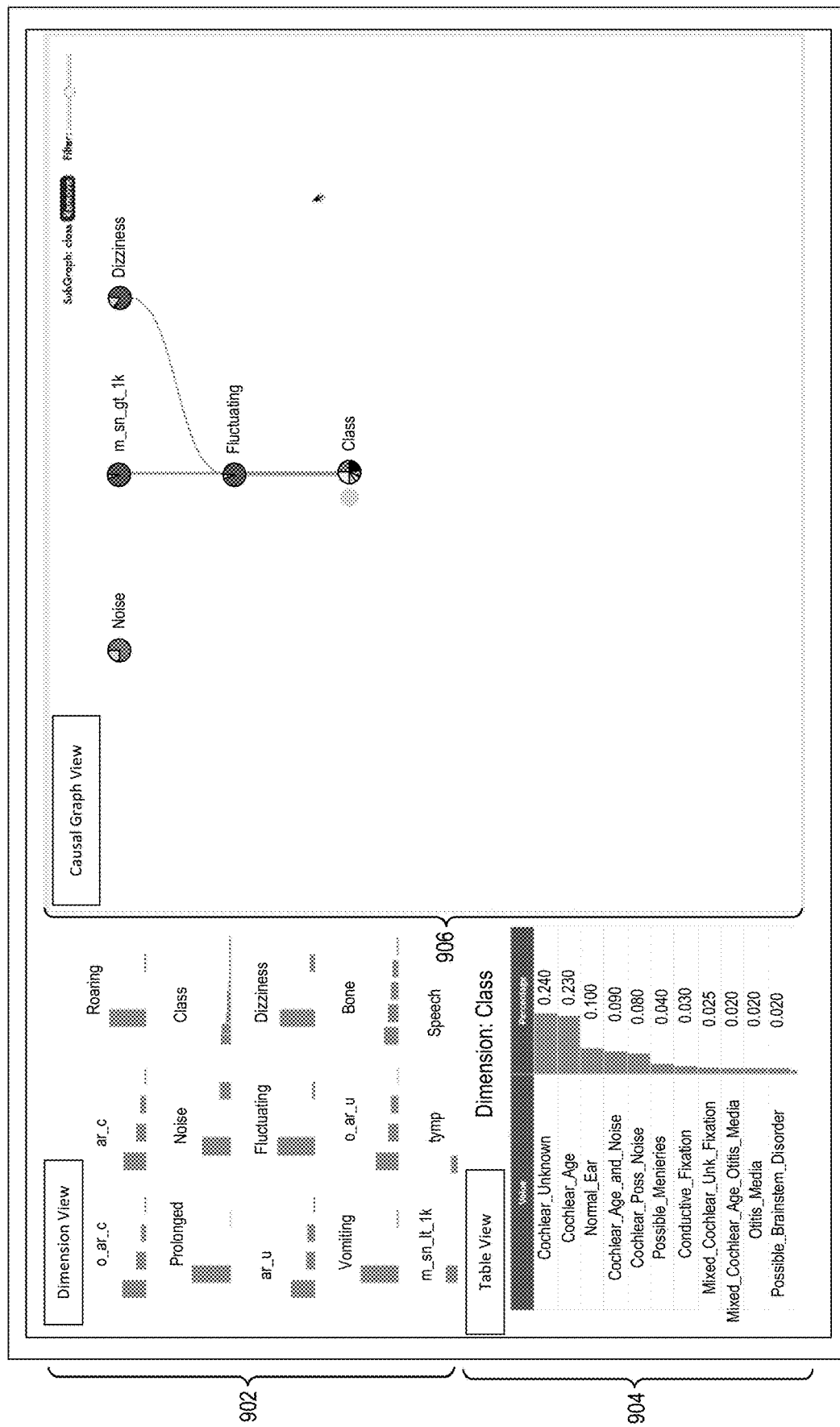
FIG. 9 illustrates an example causal sub-graph in accordance with one or more embodiments.

As mentioned, in certain embodiments, the causality-visualization system 102 generates a causal sub-graph for a particular selected node. In particular, in certain implementations, the causality-visualization system 102 causes a client device (e.g., the client device 108) to display a visual representation of only those layered nodes that have causal contributions for a selected node. FIG. 9 illustrates an example causal sub-graph interface 906 in accordance with one or more embodiments.

As illustrated in FIG. 9, the client device 108 displays the causal sub-graph interface 906 including layered nodes for a selected dimension (e.g., "Class") along with layered nodes for related dimensions with causal contributions to the selected dimension. Indeed, the causal sub-graph interface 906 includes only the nodes for the selected dimension and the related dimensions with causal contributions to the selected dimension, while hiding other nodes from view. The client device 108 further displays a dimension view 902 for various dimensions and a table view 904 of dimension values for the selected "Class" dimension.

To generate a causal sub-graph for the causal sub-graph interface 906, the causality-visualization system 102 identifies a selected dimension and further identifies dimensions with causal relationships indicating causal contributions to the selected dimension. For instance, the causality-visualization system 102 receives an indication of a user interaction selecting the "Class" dimension. Based on the user interaction, the causality-visualization system 102 identifies causal relationships for the selected dimension to identify related dimensions. Within the related dimensions, the causality-visualization system 102 further identifies those related dimensions that contribute to the causality of the selected dimension by, for example, identifying related dimensions with causal relationships with causal directionality leading to the selected dimension rather than from the selected dimension.

Figure 10:
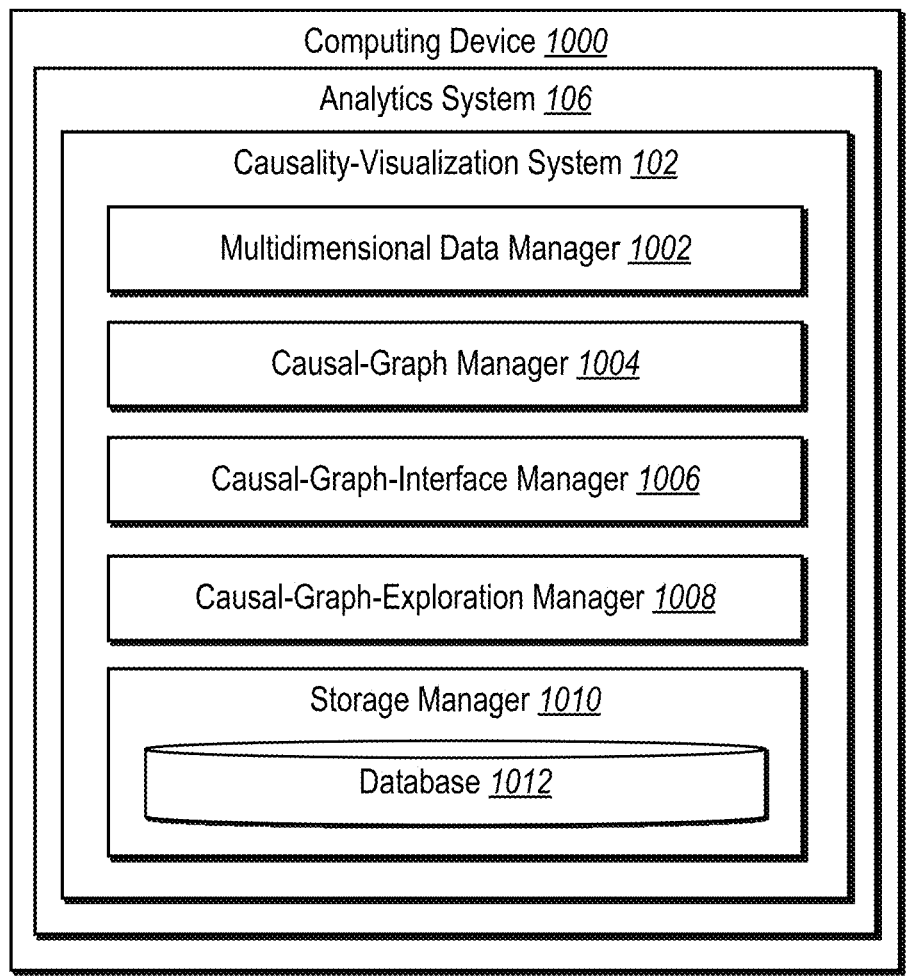
FIG. 10 illustrates a schematic diagram of a causality-visualization system in accordance with one or more embodiments.

Looking now to FIG. 10, additional detail will be provided regarding components and capabilities of the causality-visualization system 102. Specifically, FIG. 10 illustrates an example schematic diagram of the causality-visualization system 102 on an example computing device 1000 (e.g., one or more of the client device 108, the client device 702, the client device 802, and/or the server(s) 104). As shown in FIG. 10, the causality-visualization system 102 includes a multidimensional data manager 1002, a causal-graph manager 1004, a causal-graph-interface manager 1006, a causal-graph-exploration manager 1008, and a storage manager 1010.

As just mentioned, the causality-visualization system 102 includes a multidimensional data manager 1002. In particular, the multidimensional data manager 1002 manages, maintains, generates, identifies, accesses, organizes, parses, or otherwise utilizes multidimensional data. For example, the multidimensional data manager 1002 accesses a multidimensional dataset for a digital content campaign, an educational study, or a medicinal study. From the multidimensional dataset, the multidimensional data manager 1002 identifies dimensions and further identifies dimension values within the identified dimensions. In some cases, the multidimensional data manager 1002 communicates with the storage manager 1010 to access and/or store multidimensional data from the database 1012.

As also mentioned, the causality-visualization system 102 includes a causal-graph manager 1004. In particular, the causal-graph manager 1004 manages, maintains, generates, discovers, determines, detects, or identifies a causal graph indicating causal relationships among dimensions of a multidimensional dataset. For example, the causal-graph manager 1004 accesses multidimensional data to determine causal relationships among dimensions. Using the processes and techniques described herein, the causal-graph manager 1004 determines causality from dimension to dimension. In addition, the causal-graph manager 1004 determines uncertainty metrics associated with causal relationships.

In addition, the causality-visualization system 102 includes a causal-graph-interface manager 1006. In particular, the causal-graph-interface manager 1006 manages, maintains, generates, displays, presents, or provides for presentation or display a causal-graph interface. For example, the causal-graph-interface manager 1006 communicates with the causal-graph manager 1004 to generate layered nodes as visual representations of identified dimensions. In addition, the causal-graph-interface manager 1006 generates uncertainty-aware-causal edges to represent causal relationships and uncertainty metrics. Further, the causal-graph-interface manager 1006 arranges the layered nodes in a stratified, top-down fashion with childless nodes in leftmost positions, as described herein.

Further, the causality-visualization system 102 includes a causal-graph-exploration manager 1008. In particular, the causal-graph-exploration manager 1008 manages, provides, generates, enables, or facilitates exploration of a causal-graph interface. For example, the causal-graph-exploration manager 1008 receives an indication of a user interaction to determine an attribution or an intervention. In response, the causal-graph-exploration manager 1008 generates an attribution or an intervention and provides the results for display, as described above. The causal-graph-exploration manager 1008 further receives an indication of a user interaction to select a particular node to animate causal directionality flowing into and out of the node. In addition, the causal-graph-exploration manager 1008 receives an indication of a user interaction to select a particular node and, in response, the causal-graph-exploration manager 1008 generates a causal sub-graph for the selected node.

The causality-visualization system 102 further includes a storage manager 1010. The storage manager 1010 operates in conjunction with or include one or more memory devices such as the database 1012 (e.g., the database 114) that store various data such as a multidimensional dataset and the algorithms described herein. The storage manager 1010 (e.g. via a non-transitory computer memory/one or more memory devices) stores and maintain data associated with determining causal relationships and uncertainty metrics from multidimensional data and generating causal-graph interfaces (e.g., within the database 1012).

In one or more embodiments, each of the components of the causality-visualization system 102 are in communication with one another using any suitable communication technologies. Additionally, the components of the causality-visualization system 102 is in communication with one or more other devices including one or more client devices described above. It will be recognized that although the components of the causality-visualization system 102 are shown to be separate in FIG. 10, any of the subcomponents may be combined into fewer components, such as into a single component, or divided into more components as may serve a particular implementation. Furthermore, although the components of FIG. 10 are described in connection with the causality-visualization system 102, at least some of the components for performing operations in conjunction with the causality-visualization system 102 described herein may be implemented on other devices within the environment.

The components of the causality-visualization system 102 can include software, hardware, or both. For example, the components of the causality-visualization system 102 can include one or more instructions stored on a computer-readable storage medium and executable by processors of one or more computing devices (e.g., the computing device 1000). When executed by the one or more processors, the computer-executable instructions of the causality-visualization system 102 can cause the computing device 1000 to perform the methods described herein. Alternatively, the components of the causality-visualization system 102 can comprise hardware, such as a special purpose processing device to perform a certain function or group of functions. Additionally, or alternatively, the components of the causality-visualization system 102 can include a combination of computer-executable instructions and hardware.

Furthermore, the components of the causality-visualization system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the causality-visualization system 102 may be implemented as part of a stand-alone application on a personal computing device or a mobile device. Alternatively, or additionally, the components of the causality-visualization system 102 may be implemented in any application that allows creation and delivery of marketing content to users, including, but not limited to, applications in ADOBE MARKETING CLOUD, such as ADOBE CAMPAIGN, ADOBE EXPERIENCE CLOUD, and ADOBE ANALYTICS. "ADOBE," "EXPERIENCE CLOUD," "MARKETING CLOUD," "CAMPAIGN," and "ANALYTICS" are trademarks of Adobe Inc. in the United States and/or other countries.

FIGS. 1-10, the corresponding text, and the examples provide a number of different systems, methods, and non-transitory computer readable media for generating and providing a causal-graph interface depicting causal relationships and uncertainty metrics. In addition to the foregoing, embodiments can also be described in terms of flowcharts comprising acts for accomplishing a particular result. For example, FIG. 11 illustrates a flowchart of an example sequence or series of acts in accordance with one or more embodiments.

Figure 11:
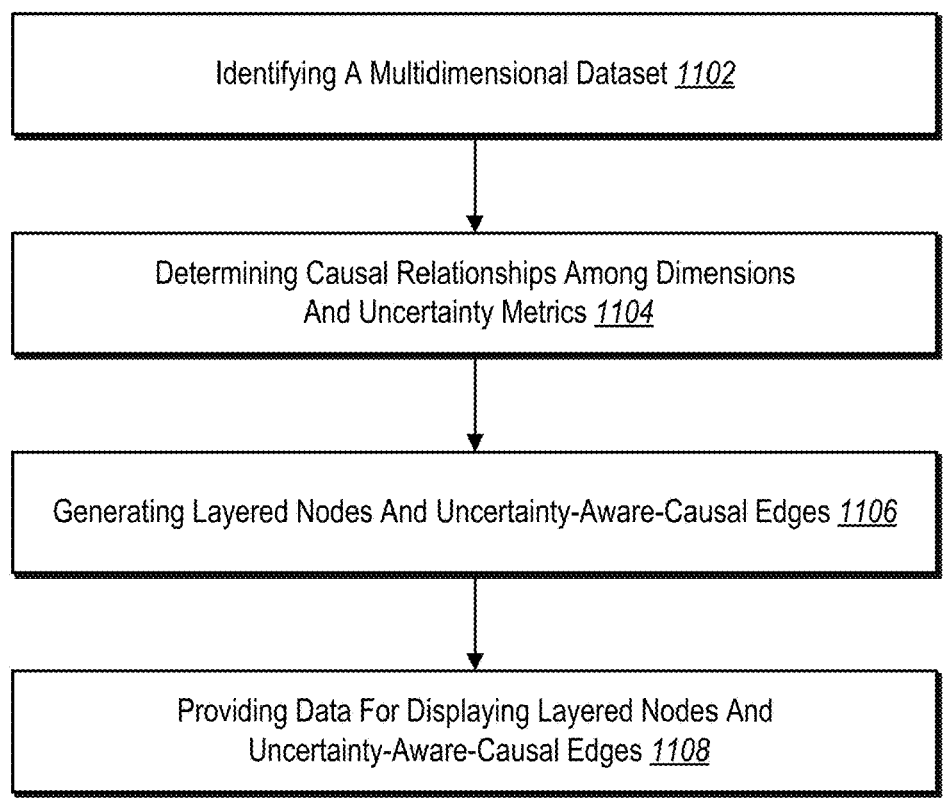
FIG. 11 illustrates a flowchart of a series of acts for generating and providing a causal-graph interface depicting causal relationships and uncertainty metrics for such relationships in accordance with one or more embodiments.

While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 of generating and providing a causal-graph interface depicting causal relationships and uncertainty metrics. In particular, the series of acts 1100 includes an act 1102 of identifying a multidimensional dataset. For example, the act 1002 involves identifying a multidimensional dataset comprising dimensions and dimension values corresponding to the dimensions.

As shown, the series of acts 1100 includes an act 1104 of determining causal relationships among dimensions and uncertainty metrics. In particular, the act 1104 involves determining, for a causal graph reflecting the dimensions of the multidimensional dataset, causal relationships among one or more of the dimensions and uncertainty metrics for the causal relationships.

As further shown in FIG. 11, the series of acts 1100 includes an act 1106 of generating layered nodes and uncertainty-aware-causal edges. In particular, the act 1106 involves generating, from the causal graph, layered nodes representing the dimensions and the dimension values from the multidimensional dataset and uncertainty-aware-causal edges connecting nodes from different layers of the layered nodes while visually representing the causal relationships and the uncertainty metrics. In some embodiments, the act 1106 involves determining a thickness reflecting an uncertainty metric of an uncertainty-aware-causal edge. In certain cases, the act 1106 involves generating, from the causal graph, layered nodes representing the dimensions and the dimension values and connected by uncertainty-aware-causal edges among the layered nodes by: generating parent nodes within one or more higher layers above corresponding child nodes within one or more lower layers, and connecting a parent node with a child node utilizing an uncertainty-aware-causal edge to visually represent a causal relationship and a corresponding uncertainty metric for the causal relationship. In one or more embodiments, the act 1106 involves comparing the uncertainty metrics associated with the causal relationships among the dimensions of the multidimensional dataset and, based on the comparison of the uncertainty metrics, generating the uncertainty-aware-causal edges by generating thicker uncertainty-aware-causal edges for more certain causal relationships and generating thinner uncertainty-aware-causal edges for less certain causal relationships.

Additionally, the series of acts 1100 includes an act 1108 of providing data for displaying layered nodes and uncertainty-aware-causal edges. In particular, the act 1108 involves providing data to a client device for displaying, within a causal-graph interface, particular layered nodes and particular uncertainty-aware-causal edges. In one or more embodiments, the act 1108 involves providing data to a client device for displaying, within a causal-graph interface, particular layered nodes and particular uncertainty-aware-causal edges arranged according to the one or more higher layers and the one or more lower layers. In some cases, the act 1108 involves providing data to the client device for displaying, within the causal-graph interface, the uncertainty-aware-causal edge exhibiting the thickness reflecting the uncertainty metric. In at least one embodiment, the act 1108 involves providing data to a client device for displaying, within a causal-graph interface, particular layered nodes and a subset of neighboring-layer edges from the uncertainty-aware-causal edges that connect nodes in neighboring layers while hiding a subset of cross-layer edges from the uncertainty-aware-causal edges that connect nodes more than one layer apart. In some cases, the act 1108 involves providing data to replace, within the causal-graph interface, a cross-layer edge with a hidden-edge indicator selectable to display the cross-layer edge.

In some embodiments, the series of acts 1100 includes an act of receiving an indication of a user interaction to determine an attribution of causal contribution to a selected dimension of the multidimensional dataset. Additionally, the series of acts 1100 includes an act of, in response to the indication of the user interaction to determine the attribution: determining causal contributions of one or more other dimensions to the selected dimension of the multidimensional dataset, and sending instructions to the client device to cause the client device to visually identify within the causal-graph interface a layered node representing a contributing dimension from the one or more other dimensions having causal contributions to the selected dimension. In these or other embodiments, the series of acts 1100 includes an act of providing data to the client device to visually identify the layered node representing the contributing dimension from the one or more other dimensions by providing data to modify a size of the layered node within the causal-graph interface to reflect a causal contribution of the contributing dimension to the selected dimension. In some cases, the series of acts 1100 includes an act of identifying a first dimension from among the other dimensions that contributes more heavily in causing the selected dimension than a second dimension as well as an act of providing data to the client device to reflect the causal contributions of the first dimension and the second dimension by enlarging a layered node corresponding to the first dimension within the causal-graph interface relative to a layered node corresponding to the second dimension.

In one or more embodiments, the series of acts 1100 includes an act of receiving an indication of a user interaction to perform an intervention by modifying a dimension value of a selected dimension of the multidimensional dataset. Further, the series of acts 1100 includes an act of, in response to the indication of the user interaction to perform the intervention: generate predicted changes to related dimension values of one or more related dimensions of the multidimensional dataset based on modifications to the one or more dimension values of the selected dimension, and send instructions to cause the client device to modify graphical representations of the related dimension values to visually indicate initial values of the related dimension values prior to the intervention and the predicted changes to the related dimension values after the intervention. In some embodiments, the series of acts 1100 includes an act of providing data to the client device to reflect the predicted changes to dimension values by displaying, for a related dimension value with a predicted change, a hybrid graphical bar comprising a first section depicting an initial value of the related dimension value prior to the intervention and a second section depicting the predicted change to the related dimension value after the intervention.

In certain embodiments, the series of acts 1100 includes an act of determining, from the causal relationships among the dimensions of the multidimensional dataset, the different layers for arranging the layered nodes in relation to each other. In some cases, the series of acts 1100 includes an act of identifying, from among the uncertainty-aware-causal edges, cross-layer edges representing causal relationships between dimensions corresponding to layered nodes more than one layer apart. In these or other cases, the series of acts 1100 includes an act of providing data to cause the client device to hide the cross-layer edges within the causal-graph interface.

In one or more embodiments, the series of acts 1100 includes an act of receiving an indication of a user interaction with a layered node within the causal-graph interface. In these or other embodiments, the series of acts 1100 includes an act of, in response to the indication of the user interaction, providing data to the client device for animating uncertainty-aware-causal edges connected to the layered node to illustrate causal directionality flowing into and out of the layered node. In certain embodiments, generating, from the causal graph, the layered nodes representing the dimensions and the dimension values from the multidimensional dataset comprises: identifying, from the causal graph, a first node connected as a parent node to a second node, the second node connected as a subsequent parent node to a third node; determining the first node, the second node, and the third node form a chain of one-to-one causal edges based on each of the first node, the second node, and the third node not connecting as a parent node to additional child nodes; and aggregating the first node, the second node, and the third node into a node group within a single layer.

The acts 1100 can include an act of generating the parent nodes within the one or more higher layers above the corresponding child nodes within the one or more lower layers by: grouping, into a first layer of nodes, a first set of nodes that do not have parent nodes or causal edges representing causal relationships with contributing dimensions, and grouping, into a second layer of nodes, a second set of nodes connected by causal edges to the first set of nodes indicating one or more of the first set of nodes are parent nodes to one or more of the second set of nodes.

In at least one embodiment, the series of acts 1100 includes an act of identifying a causal relationship between a particular parent node and a particular child node more than one layer apart from the particular parent node. Further, the series of acts 1100 includes an act of generate a cross-layer edge representing the causal relationship between the particular parent node and the particular child node and an act of providing data to cause the client device to hide the cross-layer edge within the causal-graph interface and display a hidden-edge indicator selectable to display the cross-layer edge between the particular parent node and the particular child node.

In some embodiments, the series of acts 1100 includes an act of arranging, from the causal graph, child nodes without descendants in leftmost positions within their respective layers. In the same or other embodiments, the series of acts 1100 includes an act of receiving an indication of a user selection of a layered node as well as an act of, in response to the indication of the user selection, generating a causal sub-graph for the selected layered node by identifying layered nodes having causal contributions to the selected layered node to include within the causal sub-graph and an act of providing data to the client device for displaying the causal sub-graph.

In some cases, the series of acts 1100 includes an act of receiving an indication of a user interaction with a layered node within the causal-graph interface. The series of acts 1100 further includes an act of, in response to the indication of the user interaction, providing data to the client device for: animating a first uncertainty-aware-causal edge connecting the layered node with a parent node in a higher layer to reflect a first causal directionality from the parent node to the layered node, and animating a second uncertainty-aware-causal edge connecting the layered node with a child node from a lower layer to reflect a second causal directionality from the layered node to the child node.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
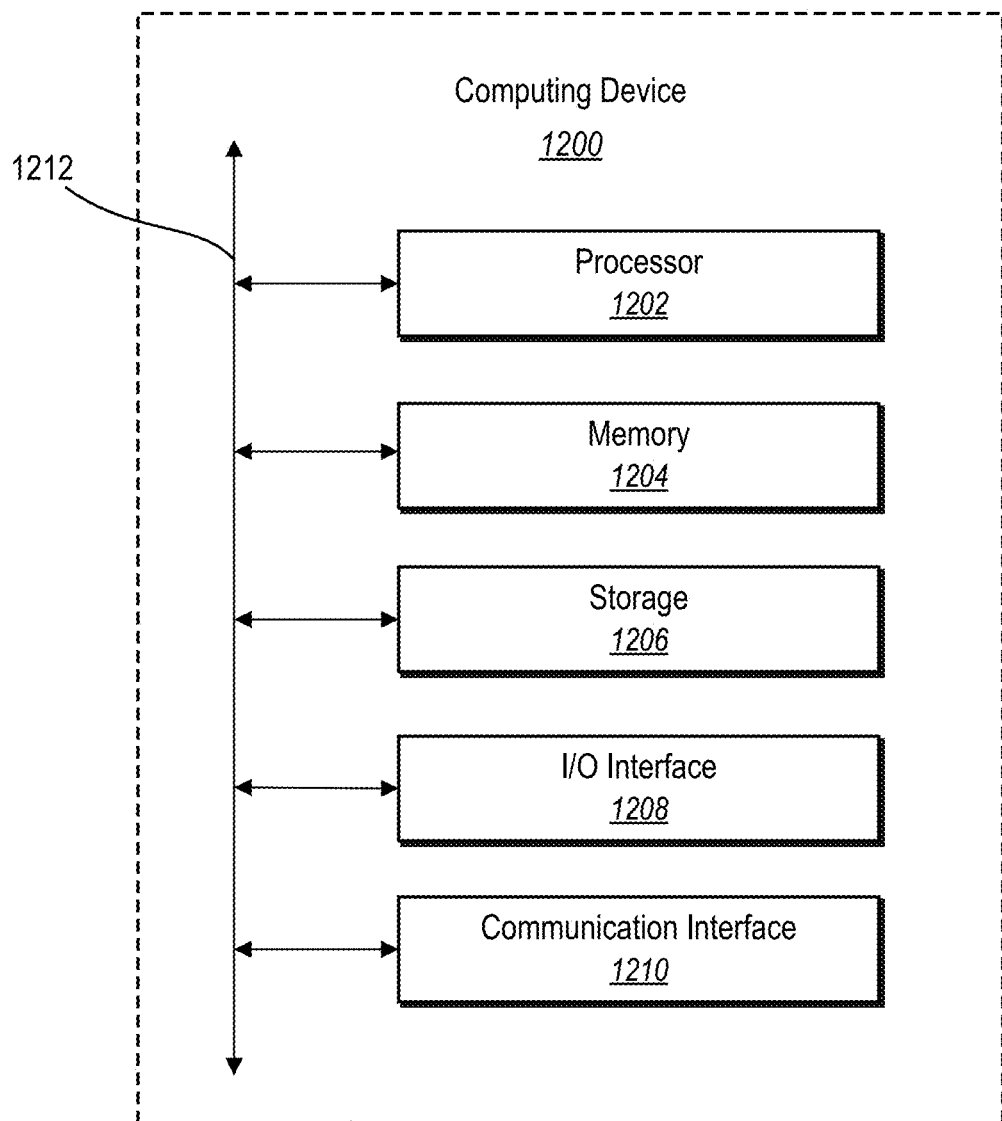
FIG. 12 illustrates a block diagram of an example computing device in accordance with one or more embodiments.

FIG. 12 illustrates, in block diagram form, an example computing device 1200 (e.g., the computing device 1000, the client device 108, and/or the server(s) 104) that may be configured to perform one or more of the processes described above. One will appreciate that the causality-visualization system 102 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
   identify a multidimensional dataset comprising dimensions and dimension values corresponding to the dimensions;
   determine, for a causal graph reflecting the dimensions of the multidimensional dataset, causal relationships among one or more of the dimensions and uncertainty metrics for the causal relationships;
   generate, from the causal graph, layered nodes representing the dimensions and the dimension values from the multidimensional dataset and uncertainty-aware-causal edges connecting nodes from different layers of the layered nodes while visually representing the causal relationships and the uncertainty metrics; and
   provide data to a client device for displaying, within a causal-graph interface, particular layered nodes and particular uncertainty-aware-causal edges.

2. The non-transitory computer readable medium of claim 1, further comprising instructions that, when executed by the at least one processor, cause the computing device to:
   receive an indication of a user interaction to determine an attribution of causal contribution to a selected dimension of the multidimensional dataset; and
   in response to the indication of the user interaction to determine the attribution:
     determine causal contributions of one or more other dimensions to the selected dimension of the multidimensional dataset; and
     send instructions to the client device to cause the client device to visually identify within the causal-graph interface a layered node representing a contributing dimension from the one or more other dimensions having causal contributions to the selected dimension.

3. The non-transitory computer readable medium of claim 2, further comprising instructions that, when executed by the at least one processor, cause the computing device to provide data to the client device to visually identify the layered node representing the contributing dimension from the one or more other dimensions by providing data to modify a size of the layered node within the causal-graph interface to reflect a causal contribution of the contributing dimension to the selected dimension.

4. The non-transitory computer readable medium of claim 1, further comprising instructions that, when executed by the at least one processor, cause the computing device to:
   receive an indication of a user interaction to perform an intervention by modifying one or more dimension values of a selected dimension of the multidimensional dataset; and
   in response to the indication of the user interaction to perform the intervention:
     generate predicted changes to related dimension values of one or more related dimensions of the multidimensional dataset based on modifications to the one or more dimension values of the selected dimension; and
     send instructions to the client device to cause the client device to modify graphical representations of the related dimension values to visually indicate initial values of the related dimension values prior to the intervention and the predicted changes to the related dimension values after the intervention.

5. The non-transitory computer readable medium of claim 1, further comprising instructions that, when executed by the at least one processor, cause the computing device to:
 determine, from the causal relationships among the dimensions of the multidimensional dataset, the different layers for arranging the layered nodes in relation to each other;
 identify, from among the uncertainty-aware-causal edges, cross-layer edges representing causal relationships between dimensions corresponding to layered nodes more than one layer apart; and
 provide data to cause the client device to hide the cross-layer edges within the causal-graph interface.

6. The non-transitory computer readable medium of claim 1, further comprising instructions that, when executed by the at least one processor, cause the computing device to:
 generate the uncertainty-aware-causal edges to visually represent the uncertainty metrics by determining a thickness reflecting an uncertainty metric of an uncertainty-aware-causal edge; and
 provide data to the client device for displaying, within the causal-graph interface, the uncertainty-aware-causal edge exhibiting the thickness reflecting the uncertainty metric.

7. The non-transitory computer readable medium of claim 1, further comprising instructions that, when executed by the at least one processor, cause the computing device to:
 receive an indication of a user interaction with a layered node within the causal-graph interface; and
 in response to the indication of the user interaction, provide data to the client device for animating uncertainty-aware-causal edges connected to the layered node to illustrate causal directionality flowing into and out of the layered node.

8. A system comprising:
 one or more memory devices comprising a multidimensional dataset comprising dimensions and dimension values corresponding to the dimensions; and
 one or more computing devices that are configured to cause the system to:
  determine, for a causal graph reflecting the dimensions of the multidimensional dataset, causal relationships among one or more of the dimensions and uncertainty metrics for the causal relationships;
  generate, from the causal graph, layered nodes representing the dimensions and the dimension values and connected by uncertainty-aware-causal edges among the layered nodes by:
   generating parent nodes within one or more higher layers above corresponding child nodes within one or more lower layers; and
   connecting a parent node with a child node utilizing an uncertainty-aware-causal edge to visually represent a causal relationship and a corresponding uncertainty metric for the causal relationship; and
  provide data to a client device for displaying, within a causal-graph interface, particular layered nodes and particular uncertainty-aware-causal edges arranged according to the one or more higher layers and the one or more lower layers.

9. The system of claim 8, wherein the one or more computing devices are further configured to cause the system to generate the parent nodes within the one or more higher layers above the corresponding child nodes within the one or more lower layers by:
 grouping, into a first layer of nodes, a first set of nodes that do not have parent nodes or causal edges representing causal relationships with contributing dimensions; and
 grouping, into a second layer of nodes, a second set of nodes connected by causal edges to the first set of nodes indicating one or more of the first set of nodes are parent nodes to one or more of the second set of nodes.

10. The system of claim 8, wherein the one or more computing devices are further configured to cause the system to:
 identify a causal relationship between a particular parent node and a particular child node more than one layer apart from the particular parent node;
 generate a cross-layer edge representing the causal relationship between the particular parent node and the particular child node; and
 provide data to cause the client device to hide the cross-layer edge within the causal-graph interface and display a hidden-edge indicator selectable to display the cross-layer edge between the particular parent node and the particular child node.

11. The system of claim 8, wherein the one or more computing devices are further configured to cause the system to:
 in response to an indication of a user interaction to determine an attribution of causal contribution to a selected dimension, determine causal contributions of other dimensions of the multidimensional dataset to the selected dimension;
 identify a first dimension from among the other dimensions having a larger causal contribution to the selected dimension than a second dimension from among the other dimensions; and
 provide data to the client device to reflect the causal contributions of the first dimension and the second dimension by enlarging a layered node corresponding to the first dimension within the causal-graph interface relative to a layered node corresponding to the second dimension.

12. The system of claim 8, wherein the one or more computing devices are further configured to cause the system to:
 receive an indication of a user interaction to perform an intervention by modifying a dimension value of a selected dimension from the multidimensional dataset;
 in response to the indication of the user interaction to perform the intervention:
  generate predicted changes to related dimension values of one or more related dimensions of the multidimensional dataset based on the modification of the dimension value of the selected dimension; and
  send instructions to the client device to cause the client device to modify a hybrid graphical bar comprising a first section depicting an initial value of the related dimension value prior to the intervention and a second section depicting the predicted change to the related dimension value after the intervention.

13. The system of claim 8, wherein the one or more computing devices are further configured to cause the system to arrange, from the causal graph, child nodes without descendants in leftmost positions within their respective layers.

14. The system of claim 8, wherein the one or more computing devices are further configured to cause the system to:

receive an indication of a user selection of a layered node;

in response to the indication of the user selection, generate a causal sub-graph for the selected layered node by identifying layered nodes having causal contributions to the selected layered node to include within the causal sub-graph; and provide data to the client device for displaying the causal sub-graph.

15. A computer-implemented method for generating and providing visualizations of causal relationships among dimensions of multidimensional data, the computer-implemented method comprising:

identifying a multidimensional dataset comprising dimensions and dimension values corresponding to the dimensions;

determining, for a causal graph reflecting the dimensions of the multidimensional dataset, causal relationships among one or more of the dimensions and uncertainty metrics for the causal relationships;

generating, from the causal graph, layered nodes representing the dimensions and the dimension values from the multidimensional dataset and uncertainty-aware-causal edges connecting nodes from different layers of the layered nodes while visually representing the causal relationships and the uncertainty metrics; and providing data to a client device for displaying, within a causal-graph interface, particular layered nodes and a subset of neighboring-layer edges from the uncertainty-aware-causal edges that connect nodes in neighboring layers while hiding a subset of cross-layer edges from the uncertainty-aware-causal edges that connect nodes more than one layer apart.

16. The computer-implemented method of claim 15, wherein providing data to the client device to hide the subset of cross-layer edges comprises providing data to replace, within the causal-graph interface, a cross-layer edge with a hidden-edge indicator selectable to display the cross-layer edge.

17. The computer-implemented method of claim 15, further comprising:

comparing the uncertainty metrics associated with the causal relationships among the dimensions of the multidimensional dataset; and based on the comparison of the uncertainty metrics, generating the uncertainty-aware-causal edges by generating thicker uncertainty-aware-causal edges for more certain causal relationships and generating thinner uncertainty-aware-causal edges for less certain causal relationships.

18. The computer-implemented method of claim 15, wherein generating, from the causal graph, the layered nodes representing the dimensions and the dimension values from the multidimensional dataset comprises:

identifying, from the causal graph, a first node connected as a parent node to a second node, the second node connected as a subsequent parent node to a third node;

determining the first node, the second node, and the third node form a chain of one-to-one causal edges based on each of the first node, the second node, and the third node not connecting as a parent node to additional child nodes; and aggregating the first node, the second node, and the third node into a node group within a single layer.

19. The computer-implemented method of claim 15, further comprising:

receiving an indication of a user interaction with a layered node within the causal-graph interface; and in response to the indication of the user interaction, providing data to the client device for:

animating a first uncertainty-aware-causal edge connecting the layered node with a parent node in a higher layer to reflect a first causal directionality from the parent node to the layered node; and animating a second uncertainty-aware-causal edge connecting the layered node with a child node from a lower layer to reflect a second causal directionality from the layered node to the child node.

20. The computer-implemented method of claim 15, further comprising:

determining an attribution of causal contributions of contributing dimensions of the multidimensional dataset to a selected dimension of the multidimensional dataset; and in response to determining the attribution, modifying sizes of layered nodes representing the contributing dimensions within the causal-graph interface to reflect the causal contributions of the contributing dimensions to the selected dimension.

* * * * *